United States Patent [19]

Gardner et al.

[11] Patent Number: 5,102,616
[45] Date of Patent: Apr. 7, 1992

[54] FULL PRESSURE PASSIVE EMERGENCY CORE COOLING AND RESIDUAL HEAT REMOVAL SYSTEM FOR WATER COOLED NUCLEAR REACTORS

[75] Inventors: Frederick J. Gardner, Derby; Rodney Strong, Nottingham, both of England

[73] Assignee: Rolls-Royce and Associates Limited, Derby, England

[21] Appl. No.: 382,172

[22] Filed: Jul. 19, 1989

[30] Foreign Application Priority Data

Jul. 21, 1988 [GB] United Kingdom ............... 8817394

[51] Int. Cl.⁵ ............................................. G21C 15/18
[52] U.S. Cl. .................................. 376/282; 376/299; 376/307; 376/406
[58] Field of Search ............... 376/281, 282, 298, 299, 376/307, 406

[56] References Cited

U.S. PATENT DOCUMENTS

| | | | |
|---|---|---|---|
| 3,566,904 | 4/1969 | Davis | 137/206 |
| 4,526,742 | 7/1985 | Hannerz | 376/282 |
| 4,696,791 | 9/1987 | Straub | 376/282 |
| 4,728,486 | 3/1988 | Kish | 376/307 |
| 4,753,771 | 6/1988 | Conway et al. | 376/282 |
| 4,783,306 | 11/1988 | Vecsey et al. | 376/282 |

FOREIGN PATENT DOCUMENTS

| | | |
|---|---|---|
| 0157321 | 9/1985 | European Pat. Off. ............ 376/282 |
| 0164525 | 12/1985 | European Pat. Off. . |
| 0174380 | 3/1986 | European Pat. Off. . |
| 2502828 | 1/1982 | France . |
| 887252 | 1/1962 | United Kingdom . |
| 1446283 | 8/1976 | United Kingdom . |

OTHER PUBLICATIONS

Nuclear Technology, vol. 76, No. 1, Jan. 1987, pp. 185-192.

Primary Examiner—Daniel D. Wasil
Attorney, Agent, or Firm—Cushman, Darby & Cushman

[57] ABSTRACT

A water cooled nuclear reactor comprises a reactor core, a primary water coolant circuit and a pressurizer arranged as an integral unit in a pressure vessel. A passive full pressure emergency core cooling and residual heat removal system is provided which comprises a tank having a reserve supply of water positioned above the primary water coolant circuit or the reactor core. The tank is interconnected to the primary water coolant circuit by a first pipe and a second pipe. The first pipe has an inverted U-bend which passes through a water space and a steam space of the pressurizer to form a vapor lock. The first pipe and second pipe are also provided with hydrostatic thermal seals. The tank has one or more residual heat removal circuits comprising a heat exchanger positioned in the tank and a heat exchanger outside the tank. Movement of the vapor lock from the inverted U-bend allows cool water from the tank to flow into the primary water coolant circuit and hot water to flow into the tank to be cooled. The vapor lock detects abnormalities in the reactor core and primary water coolant circuit and in the water level in the pressurizer, and automatically initiates full pressure passive emergency cooling and residual heat removal.

42 Claims, 18 Drawing Sheets

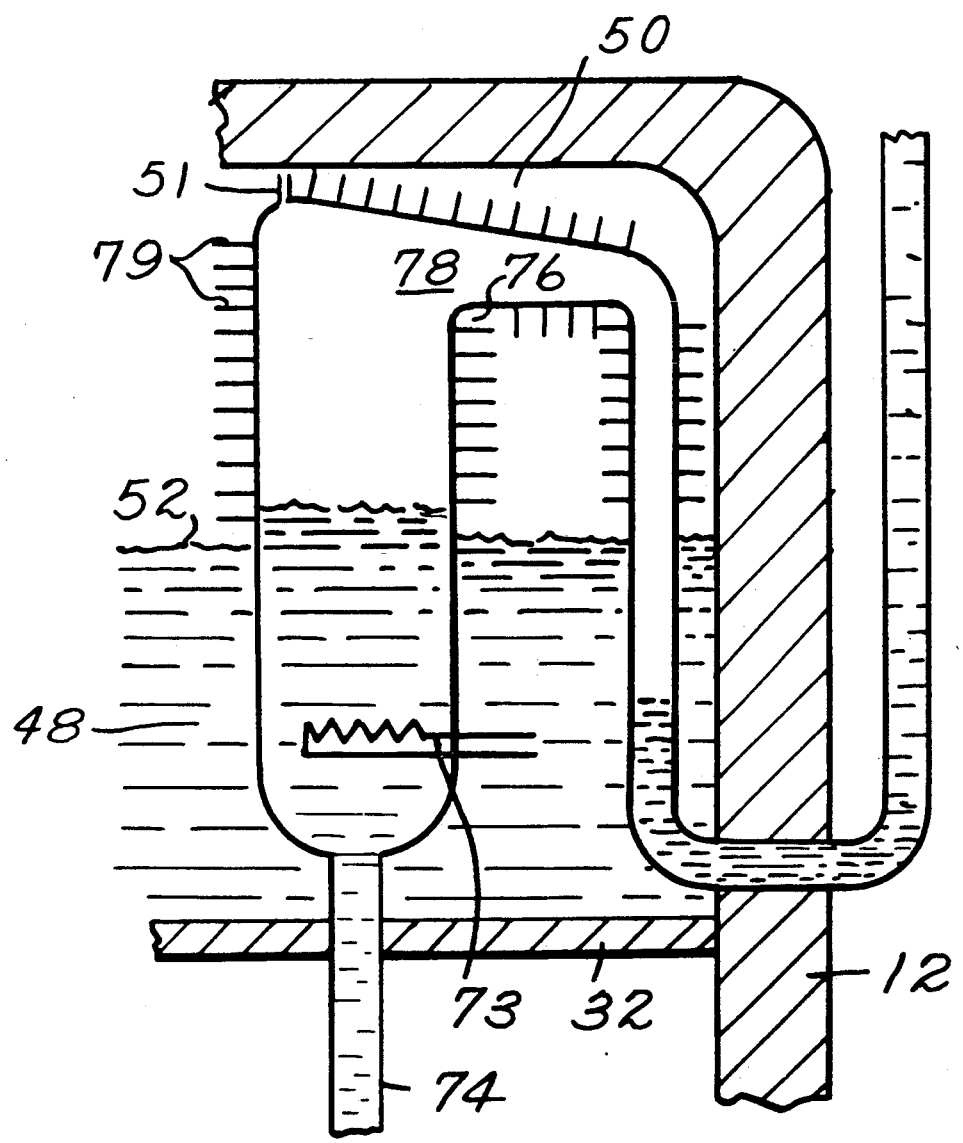

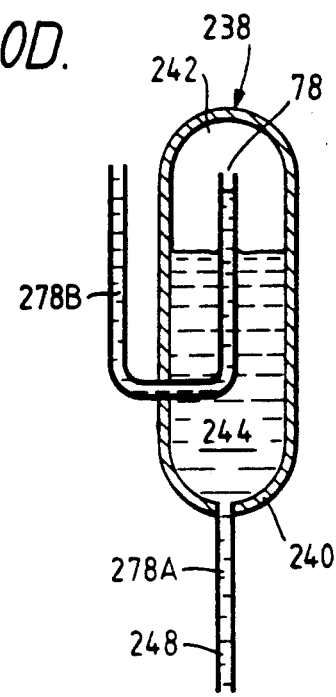
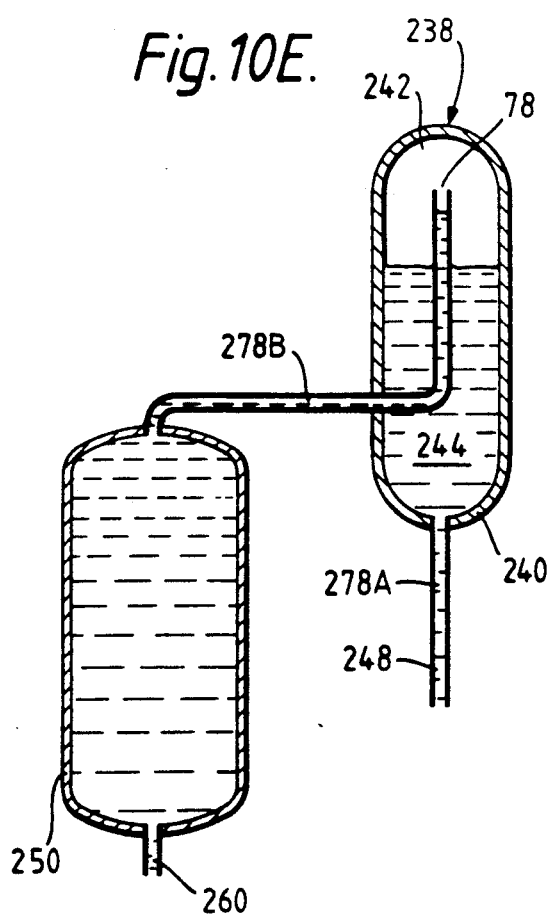
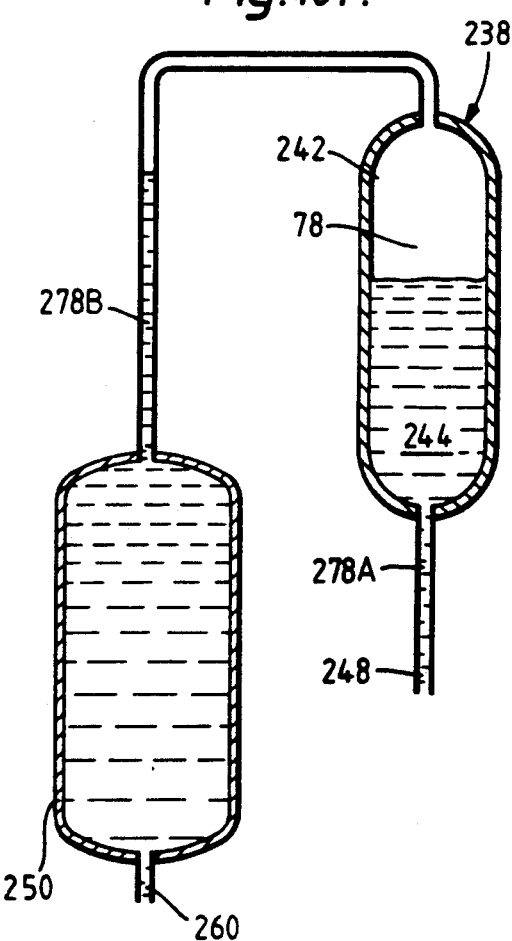

FULL PRESSURE PASSIVE EMERGENCY CORE COOLING AND RESIDUAL HEAT REMOVAL SYSTEM FOR WATER COOLED NUCLEAR REACTORS

The present invention relates to integral water cooled nuclear reactors with pressurisers, and is particularly applicable to water cooled nuclear reactors of the integral pressurised water reactor (PWR) type and the integral indirect cycle boiling water reactor (BWR) type with integral pressurisers. However the invention is also applicable to integral water cooled nuclear reactors with separate pressurisers and to dispersed or loop type pressurised water reactors (PWR's) with separate pressurisers.

A problem with water cooled nuclear reactors is that under some severe accident conditions effective cooling of the nuclear reactor core can be lost very quickly. Emergency core cooling systems are provided in the prior art, but under some severe circumstances these are not sufficiently fast acting to restore cooling before some damage to the nuclear reactor core occurs. The design philosophy of these emergency core cooling systems is to restore cooling to the nuclear reactor core before the core damage results in an uncoolable nuclear reactor core geometry rather than to prevent damage to the nuclear reactor core under all circumstances.

A further problem with water cooled nuclear reactors is the long term removal of residual heat from the nuclear reactor core in the event that heat removal by the normal means is lost. Residual heat removal systems are provided in the prior art for such emergencies.

Emergency core cooling and residual heat removal systems of the prior art are controlled and operated by active components which may fail to function when required. Residual heat removal systems of the prior art also have active pumping components. Such active components require external electrical or other energy sources which may fail to operate during emergency conditions. To mitigate such possibilities the emergency core cooling and residual heat removal systems of the prior art and their support systems are replicated leading to complication and high cost. Such prior art emergency core cooling and residual heat removal systems of the prior art make it difficult to produce cost effective water cooled nuclear reactor power plants of low and moderate power rating.

The present invention seeks to provide an emergency core cooling and residual heat removal system which maintains nuclear reactor core cooling at all times during severe accident conditions by passive safety systems, which are continuously available when the nuclear reactor is operating normally, to prevent nuclear reactor core damage.

The present invention also seeks to provide a low cost water cooled nuclear reactor power plant in low and moderate power ratings by simplification of safety systems and by obviating the need for replication.

According to the present invention a water cooled nuclear reactor comprises a pressure vessel, a reactor core, a primary water coolant circuit arranged to cool the reactor core, the reactor core and at least a portion of the primary water coolant circuit being located in the pressure vessel, a pressuriser having a water space and a steam space, at least one full pressure reactor core cooler means, a first pipe means to interconnect an upper portion of the primary water coolant circuit with each full pressure reactor core cooler means, a second pipe means to interconnect a lower portion of the primary water coolant circuit with each full pressure reactor core cooler means, each first pipe means having a first inverted U-bend, each first inverted U-bend of the first pipe means passes through the water space and steam space of the pressuriser to form a vapour lock within each first inverted U-bend, whereby each vapour lock in normal operation substantially prevents a natural circulation of primary water coolant from the primary water coolant circuit through the first pipe means, the full pressure reactor core cooler means and the second pipe means to the primary water coolant circuit, each vapour lock sensing abnormal operation of any of the reactor core, the primary water coolant circuit, the pressuriser or loss of primary water coolant and thereby being displaced from the first inverted U-bend to allow a natural circulation of primary water coolant from the primary water coolant circuit through the first pipe means, the full pressure reactor core cooler means and the second pipe means to allow relatively cool primary water coolant from the full pressure reactor core cooler means flow into or through the primary water coolant circuit.

Preferably at least one of the full pressure reactor core cooler means may comprise a full pressure emergency core coolant tank having a reserve supply of primary water coolant, the first pipe means interconnects an upper portion of the primary water coolant circuit with an upper portion of the full pressure emergency core coolant tank, the second pipe means interconnects a lower portion of the primary water coolant circuit with a lower portion of the full pressure emergency core coolant tank, at least a portion of the full pressure emergency core coolant tank being positioned above the reactor core, the first pipe means having a first inverted U bend, the first inverted U-bend of the first pipe means passes through the water space and steam space of the pressuriser to form a vapour lock within the first inverted U-bend, whereby the vapour lock in normal operation substantially prevents a natural circulation of primary water coolant from the primary water coolant circuit through the first pipe means, the full pressure emergency core coolant tank and the second pipe means to the primary water coolant circuit, the vapour lock sensing abnormal operation of the reactor core, the primary water coolant circuit, the pressuriser or loss of primary water coolant and thereby being displaced from the first inverted U-bend to allow a natural circulation of primary water coolant from the primary water coolant circuit through the first pipe means, the full pressure emergency core coolant tank and the second pipe means to the primary water coolant circuit to allow relatively cool primary water coolant in the full pressure emergency core coolant tank to flow through the reactor core, or to allow primary water coolant vapour to be vented from the primary water coolant circuit through the first pipe means into the full pressure emergency core coolant tank to facilitate a gravity feed of primary water coolant from the full pressure emergency core coolant tank into the primary water coolant circuit.

At least one of the full pressure reactor core cooler means may comprise a full pressure residual heat removal heat exchanger, the first pipe means interconnects an upper portion of the primary water coolant circuit with an upper portion of the full pressure residual heat removal heat exchanger, the second pipe means interconnects a lower portion of the primary water coolant circuit with a lower portion of the full pressure residual heat removal heat exchanger, at least a portion of the full pressure residual heat removal heat exchanger being positioned above the primary water coolant circuit, the first pipe means having a first inverted U-bend, the first inverted U-bend of the first pipe means passes through the water space and steam space of the pressuriser to form a vapour lock within the first inverted U-bend whereby the vapour lock in normal operation substantially prevents a natural circulation of primary water coolant from the primary water coolant circuit through the first pipe means, the full pressure residual heat removal heat exchanger and the second pipe means to the primary water coolant circuit, the vapour lock upon abnormal operation of the reactor core, the primary water coolant circuit, the pressuriser or loss of primary water coolant is thereby displaced from the first inverted U-bend to allow a natural circulation of primary water coolant from the primary water coolant circuit through the first pipe means, the full pressure residual heat removal heat exchanger and the second pipe means to the primary water coolant circuit to allow relatively cool primary water coolant to flow through the reactor core.

The full pressure residual heat removal heat exchanger and the full pressure emergency core coolant tank may be integrated and fludily connected in flow series such that they share a common first pipe means, first inverted U-bend and second pipe means.

The full pressure residual heat removal heat exchanger and the full pressure emergency core coolant tank may be separate and have their own respective first pipe means, first inverted U-bend and second pipe means.

At least a portion of the full pressure emergency core coolant tank may be positioned above the primary water coolant circuit.

The inverted U-bend in the first pipe means may have an electrical immersion heater to assist in the formation and maintenance of the vapour lock and to facilitate the removal of incondensible gases.

Each first pipe means may have hydrostatic thermal seals which facilitate the circulation of warm water eddy currents within the first pipe means during normal operation of the reactor plant, but which prevent the warm water eddy currents from entering the full pressure reactor core cooler means in normal operation of the nuclear reactor and which allow the natural circulation of primary water coolant from the primary water coolant circuit through the first pipe means, the full pressure reactor core cooler means and the second pipe means if the vapour lock is displaced from the first inverted U-bend by abnormal operation of the reactor core, the primary water coolant circuit or the pressuriser.

A second inverted U-bend in each first pipe means may form one hydrostatic thermal seal.

A U-bend in the first pipe means may also form a hydrostatic thermal seal.

Each second pipe means may have a hydrostatic thermal seal preventing thermal convection of warm water from the primary water coolant circuit to the full pressure reactor core cooler means during normal operation of the reactor.

A U-bend in the second pipe means may form the hydrostatic thermal seal.

At least one pair of inverted U-bend and normal U-bend connected in series in each second pipe means may form the hydrostatic thermal seal, the inverted U-bend is positioned in a relatively hot region and the normal U-bend is positioned in a relatively cool region to produce alternating stratified zones of lower and higher water density in the hydrostatic thermal seal.

The pressuriser may have an auxiliary vessel, the auxiliary vessel having a water space and a steam space, at least the water space of the auxiliary vessel being interconnected with the water space of the pressuriser, the first inverted U-bend of the first pipe means passes through the water space and steam space of the auxiliary vessel.

The pressuriser may have an auxiliary vessel, the auxiliary vessel having a water space and a steam space, at least the water space of the auxiliary vessel being interconnected with an upper portion of the primary water coolant circuit, the first inverted U-bend of the pipe means passes through the water space and steam space of the auxiliary vessel.

The steam space of the auxiliary vessel may be interconnected with the steam space of the pressuriser.

The auxiliary vessel may have an electrical immersion heater to maintain saturation conditions in the water space and steam space of the auxiliary vessel.

The auxiliary vessel may define a portion of the first inverted U-bend and the steam space of the auxiliary vessel may form the vapour lock.

A relatively small vent may interconnect the vapour lock and the steam space of the pressuriser to allow the flow of in-condensible gases from the vapour lock to the steam space of the pressuriser, to assist in the formation and maintenance of the vapour lock in normal operation and to provide the vapour lock with the required transient response.

The full pressure emergency core cooling and residual heat removal system may have at least one residual heat removal means to remove heat from the primary water coolant in the full pressure emergency core cooling and residual heat removal system.

Each full pressure emergency core coolant tank may be integrated with the full pressure residual heat removal heat exchanger having at least one residual heat removal circuit to remove heat from the primary water coolant in a combined full pressure emergency core cooling and residual heat removal system.

The at least one combined full pressure emergency core cooling and residual heat removal tank may have an enclosed region, the first pipe means interconnects the primary water coolant circuit and the enclosed region, the enclosed region having one of the residual heat removal circuits to increase the heat transfer rate from the primary water coolant to the residual heat removal circuit.

The residual heat removal circuit may comprise a first heat exchanger positioned in the full pressure emergency core coolant and residual heat removal tank, a second heat exchanger positioned outside of the full pressure emergency core coolant and residual heat removal tank, ducting interconnecting the first and second heat exchangers to convey working fluid therebetween.

The reactor pressure vessel may be positioned in the full pressure emergency core coolant tank.

The reactor pressure vessel and pressuriser may be positioned within the combined full pressure emergency core coolant and residual heat removal tank as an integral unit, the full pressure emergency coolant tank becoming the integrated pressure vessel and the reactor vessel becoming a thermal and flow control boundary between the primary circuit and the reserve volume of full pressure emergency coolant.

A second low pressure emergency core cooling and residual heat removal system may comprise a tank having a further reserve supply of primary water coolant at low pressure, at least a portion of the low pressure emergency core cooling and residual heat removal tank being positioned above the full pressure emergency core cooling and residual heat removal system, a third pipe means to interconnect a lower portion of the second low pressure emergency core cooling and residual heat removal tank with the full pressure emergency core coolant and residual heat removal system or with the primary circuit, a fourth pipe means to interconnect the steam space of the pressuriser with the low pressure emergency core coolant tank, the third pipe means having a non return valve and a control valve, the fourth pipe means having a control valve.

At least one second residual heat removal means may be arranged to remove heat from the water in the second low pressure emergency core cooling and residual heat removal tank.

The water in low pressure emergency core cooling and residual heat removal tank may form a heat sink for the full pressure emergency core cooling and residual heat removal system.

The full pressure residual heat removal cooler may be located in the low pressure emergency core cooling and residual heat removal tank.

The full pressure emergency core cooling and residual heat removal system may be located in the low pressure emergency core cooling and residual heat removal tank.

The pressure vessel may be located within a dry chamber defined by a cylindrical walled member, the cylindrical walled member being positioned in the low pressure emergency core cooling and residual heat removal tank, a vent interconnects an upper region of the dry chamber with a lower region of the emergency core cooling and residual heat removal tank.

A containment building may contain, the reactor pressure vessel, the reactor core, the primary water coolant circuit, the pressuriser, the full pressure emergency core cooling and residual heat removal system and the second low pressure emergency core cooling and residual heat removal tank, a fifth pipe means may interconnect a pump means with the low pressure emergency core cooling and residual heat removal tank, the pump means being arranged to pump any split water coolant above a predetermined level in the containment building to the low pressure emergency core cooling and residual heat removal tank, the fifth pipe means may have a non return valve. The at least one second residual heat removal circuit may comprise a third heat exchanger positioned in the second, low pressure, emergency core cooling and residual heat removal tank, a fourth heat exchanger positioned outside of the containment building, ducting means interconnecting the third and fourth heat exchangers to convey working fluid therebetween.

A fifth heat exchanger may be positioned substantially at the uppermost region of the containment building, ducting means interconnecting the fifth heat exchanger and the fourth heat exchanger to convey working fluid therebetween, a collecting vessel positioned below the fifth heat exchanger and above the second, low pressure emergency core cooling and residual heat removal tank for collecting vapour condensed by the fifth heat exchanger, pipe means to supply condensed vapour from the collecting vessel to the second, low pressure emergency core cooling and residual heat removal tank.

Ducting means may interconnect an intermediate heat exchanger and the fourth heat exchanger to convey working fluid therebetween, the second heat exchanger exchanging heat to the intermediate heat exchanger, the intermediate heat exchanger and second heat exchanger being positioned inside the containment building.

The emergency core cooling and residual heat removal tanks may contain a neutron absorbing agent, dissolved in the water.

The neutron absorbing agent may be boron, in the form of boric acid.

At least a portion of the water space of the pressuriser may be positioned above an upper portion of the primary water coolant circuit, at least one vent means which communicates between the pressuriser and the primary water coolant circuit to connect the steam space of the pressuriser with the upper portion of the primary water coolant circuit, at least one surge port means which communicates between the pressuriser and the primary water coolant circuit to connect the water space of the pressuriser with a lower portion of the primary water coolant circuit, the at least one surge port means being arranged to have relatively low flow resistance for water from the water space of the pressuriser to the primary water coolant circuit and relatively high flow resistance for water from the primary water coolant circuit to the water space of the pressuriser, the at least one vent means which communicates between the steam space of the pressuriser and the upper portion of the primary water coolant circuit allows excess vapour formed in the primary water coolant circuit to flow to the steam space of the pressuriser.

The reactor core, the primary water coolant circuit and the pressuriser may be arranged as an integral unit enclosed by the pressure vessel, at least one casing being arranged in the pressure vessel to substantially divide the pressure vessel into a first chamber and a second chamber, the reactor core and the primary water coolant circuit being arranged in the second chamber, the pressuriser being arranged in the first chamber, the casing preventing mixing interaction between the water in the primary water coolant circuit and the water in the water space of the pressuriser.

The first pipe means may interconnect the water space of the pressuriser with the full pressure reactor core cooler means.

The reactor core may be arranged in the lower region of the pressure vessel, the primary water coolant circuit comprising a riser passage to convey relatively hot water and steam to at least one heat exchanger, and a downcomer passage to convey relatively cool water from the at least one heat exchanger to the reactor core.

The at least one heat exchanger may be a steam generator.

The heat exchanger may be positioned in the pressure vessel.

The primary water coolant circuit may comprise at least one pump to assist the circulation of primary water coolant.

The pressuriser may be a separate pressuriser.

The water cooled nuclear reactor may be an integral pressurised water reactor.

The water cooled nuclear reactor may be an integral indirect cycle boiling water reactor.

The present invention will be more fully described by way of example with reference to the accompanying drawings, in which:

FIG. 1K is an enlarged sectional view of an alternative vapor lock and inverted U-bend.

FIGS. 10B to 10F are cross-sectional views of part of FIG. 10 showing alternative vapour lock arrangements.

Figure 1:
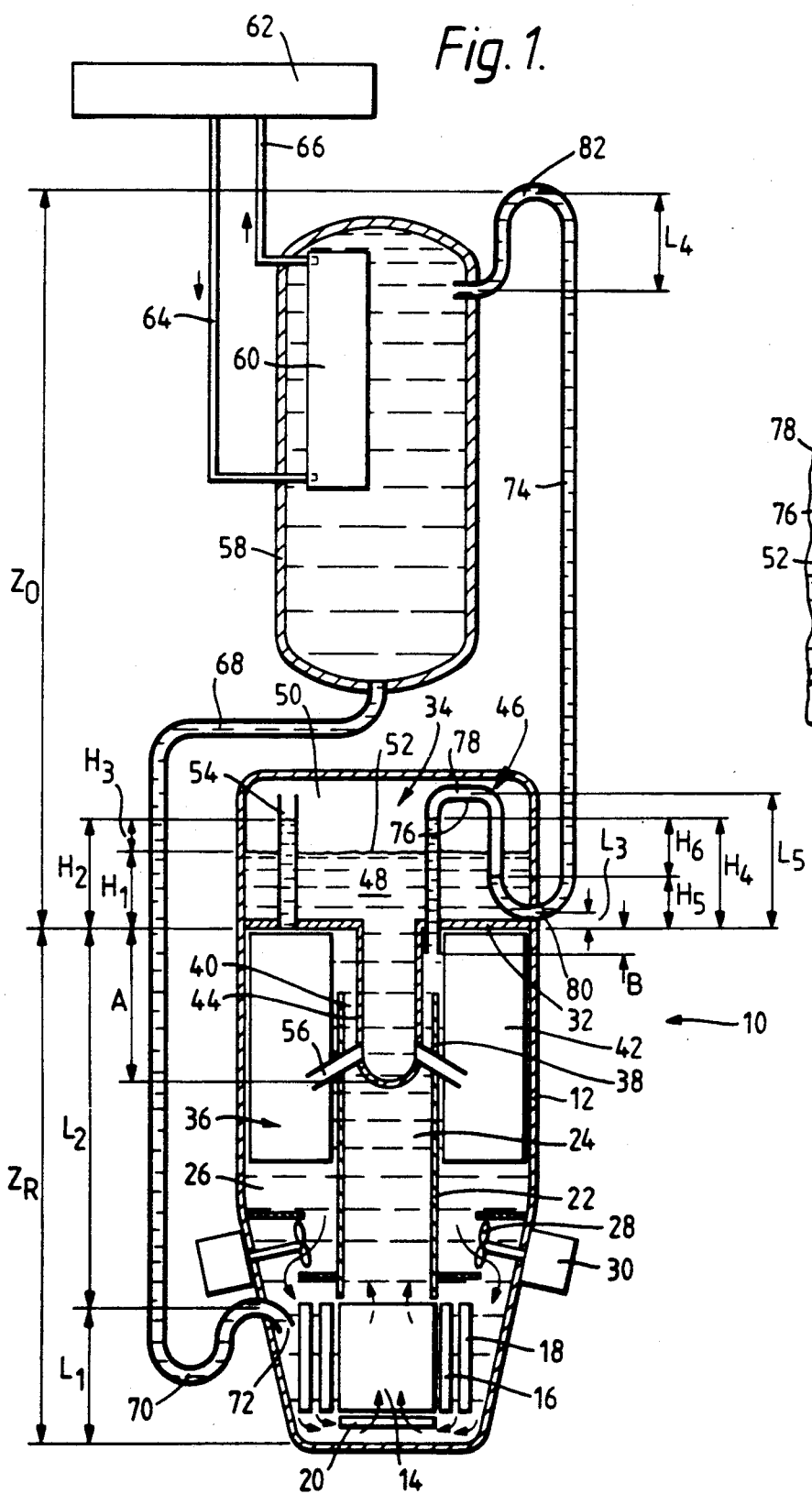
FIG. 1 is a vertical cross-sectional diagrammatical view of an integral water cooled nuclear reactor with integral pressuriser and separate full pressure emergency core cooling residual heat removal system according to the present invention.

A water cooled nuclear reactor 10 is shown in FIG. 1, this is an integral pressurised water reactor (PWR) of the type with an integral pressuriser as described more fully in our copending U.K. patent application 8808707.7.

The nuclear reactor 10 comprises a pressure vessel 12 within which is positioned a reactor core 14. The reactor core 14 is positioned substantially at the lower region of the pressure vessel 12 and the reactor core 14 is surrounded by a neutron reflector 16. The reactor core 14 includes a system of movable neutron absorbing control rods linked to drive mechanisms (not shown). A thermal shield 20 is positioned below the reactor core 14, and thermal shields 18 are positioned so as to surround the neutron reflector 16. The thermal shields 18,20 protect the pressure vessel 12 from the radiation emanating from the reactor core 14.

A primary water coolant circuit is used to cool the reactor core 14, and the primary water coolant circuit uses a pumped flow or natural circulation. The primary water coolant circuit comprises a hollow cylindrical member 22 which is aligned with and positioned vertically above the reactor core 14 to define a riser passage 24 therein for the natural vertically upward flow of relatively hot primary coolant from the reactor core 14, and an annular downcomer passage 26 is defined with the pressure vessel 12 for the natural vertically downward return flow of relatively cool primary coolant to the reactor core 14. The primary coolant circuit is also provided with one or more reactor coolant pumps 28, which are driven by motors 30. The reactor coolant pumps 28 are positioned in the downcomer passage 26.

A casing 32 is positioned in the pressure vessel 12, and divides the pressure vessel 12 into a first vertically upper chamber 34 and a second vertically lower chamber 36. The reactor core 14 and the primary water coolant circuit are arranged in the second lower chamber 36.

The cylindrical member 22 extends towards but is spaced from the top of the lower chamber 36 defined by the casing 32, and the upper region of the cylindrical member 22 is provided with apertures 38 for the distribution of flow of the primary water coolant from the riser passage 24 to the upper part of the downcomer annular passage 26. The upper end of the cylindrical member 22 has a large aperture 40 which connects the riser passage 24 to the downcomer passage 26 and allows water and vapour from the reactor core 14 to flow over the top of the cylindrical member 22 into the downcomer passage 26.

A secondary coolant circuit takes heat from the primary water coolant circuit. The secondary coolant circuit comprises one or more heat exchangers 42 positioned in the upper region of the annular downcomer passage 26. The heat exchangers 42 comprise a plurality of tubes which are arranged to receive secondary coolant from a supply of secondary coolant via a supply pipe (not shown) and inlet header (not shown), and which supply heated secondary coolant via an outlet header (not shown) and a supply pipe (not shown) for driving an electrical turbo-generator, or for district heating, process heat or for a propulsion system.

The heat exchanger 42 in this example is a steam generator, and the secondary coolant used is water. The steam generator may be a once through type or a recirculatory type with downcomer pipes between the outlet and inlet headers.

The casing 32 is secured to and seals with the pressure vessel 12, and the casing 32 has an annular member 44 which extends downwards therefrom about the axis of the pressure vessel 12, and the annular member 44 is closed at its bottom end The annular member 44 extends coaxially into the cylindrical member 22 and is spaced therefrom.

A pressuriser 46 is positioned within the pressure vessel 12 in the first vertically upper chamber 34 formed between the casing 32 and the pressure vessel 12. The pressuriser 46 contains water 48, and steam 50 separated by a water/steam interface or water level 52.

One or more large diameter vent pipes 54 interconnect the steam space 50 of the pressuriser 46 with an upper portion of the primary water coolant circuit, as shown the vent pipes 54 extend from the pressuriser steam space 50 through the pressuriser water space 48 and through the casing 32.

The bottom region of the annular member 44 is provided with a plurality of surge ports 56 which fluidly communicate between the pressuriser water space 48 and the annular downcomer passage 26 of the primary water coolant circuit. The surge ports 56 extend through the cylindrical member 22 and into the steam generator 42 region. The surge ports 56 contain hydraulic diodes (not shown) which have low flow resistance for water from the pressuriser water space 48 to the primary water coolant circuit but have high flow resistance for water from the primary water coolant circuit to the pressuriser water space 48.

At least one combined full pressure emergency core coolant and residual heat removal tank 58 is positioned vertically above the pressure vessel 12 which contains the reactor core 14, primary water coolant circuit and pressuriser 46 or alongside it at an elevation above the top of the reactor core 14. The tank 58 is filled with a reserve supply of primary water coolant at the full operating pressure of the primary water coolant circuit.

A residual heat removal circuit comprises a first heat exchanger cooler 60 positioned within the tank 58, and a second heat exchanger cooler 62 positioned outside of the tank 58. Pipes 64 and 66 fluidly interconnect the first and second heat exchanger coolers 60 and 62 for the transport of heat by natural convection of a fluid coolant from the first heat exchanger 60 to the second heat exchanger 62.

One or more pipes 68 interconnect a lower portion of the full pressure emergency core coolant and residual heat removal tank 58 with a lower portion of the primary water coolant circuit in the pressure vessel 12. In this example the pipe 68 interconnects with the downcomer annular passage 26 in the vicinity of the thermal shields 18 by a nozzle 72. The pipe 68 incorporates a U-bend 70 at a suitably low elevation before entering the pressure vessel 12 to form a hydrostatic thermal seal preventing thermal convection currents from the primary water coolant circuit to the main portion of the pipe 68 and tank 58.

A pipe 74 interconnects an upper portion of the primary water coolant circuit in the pressure vessel 12 with an upper portion of the full pressure emergency core cooling and residual heat removal tank 58. The vent pipe 74 extends through the casing 32 into the pressuriser 46, and the vent pipe 74 incorporates a first inverted U-bend 76 which passes through the water space 48 and steam space 50 of the pressuriser 46 to form a vapour lock 78 within the inverted U-bend 76.

The vent pipe 74 also has a U-bend 80 and a second inverted U-bend 82 at a suitably high elevation outside the pressure vessel 12 before it enters the full pressure emergency core cooling and residual heat removal tank 58. The second inverted U-bend 82 forms a hydrostatic thermal seal to prevent eddy currents of warm water circulating in the vent pipe 74 during normal operation of the reactor plant entering the emergency core cooling and residual heat removal tank 58.

When the integral pressurised water reactor 10 is operating in a normal steady state condition, the conditions in the pressuriser 46 determine the water coolant pressures in both the primary water coolant circuit and the full pressure emergency core coolant and residual heat removal system. The temperature of the water coolant in the emergency core coolant and residual heat removal tank 58 is determined by the first heat exchanger cooler 60 in the tank 58. This temperature will be essentially the ambient temperature of the second heat exchanger cooler 62.

Thermal convection from the primary water coolant circuit in the pressure vessel 12 to the pipes 68 is prevented by the hydrostatic thermal seal formed by the U-bend 70 low down in the pipe 68 before it enters the pressure vessel 12. Thermal convection from the exposed portion of the pipes 68 to the full pressure emergency core coolant and residual heat removal tank 58 can take place and thus the temperature of the exposed portion of the pipe 68 is determined by the temperature of the water in the emergency core coolant and residual heat removal tank 58.

Thermal convection currents in the pipe 74 from the primary water coolant circuit in the pressure vessel 12 to the full pressure emergency core coolant and residual heat removal tank 58 are not prevented without a hydrostatic thermal seal at a suitably low elevation in the pipe 74 adjacent to its exit from the pressure vessel 12. The pipe 74 temperature outside the pressure vessel 12 is higher than that in the pipes 68 and the water in the emergency core coolant and residual heat removal tank 58. Thermal convection from the external portion of the pipe 74 to the full pressure emergency core coolant and residual heat removal tank 58 is prevented by the hydrostatic thermal seal formed by the inverted U-bend 82 at the upper end of the pipe 74.

The temperatures in the portion of the pipe 74 which is within the pressure vessel 12 will assume equilibrium with the primary water coolant in the pressure vessel 12. Conditions in the inverted U-bend 76 positioned within the pressuriser 46 will be the saturation conditions prevailing in the pressuriser 46. Thus in normal operation of the reactor plant a vapour lock or vapour bubble 78 is formed in the inverted U-bend 76 of the pipe 76 which prevents natural circulation of coolant through the pipe 74, tank 58, pipe 68 and primary water coolant circuit.

The water levels in the vapour lock 78 of the pipe 74 from the primary water coolant circuit to the full pressure emergency core coolant and residual heat removal tank 58 are indicated in FIG. 1 as H4 and H5. The datum is taken as the elevation of the casing 32 separating the pressuriser 46 from the primary water coolant circuit. The difference H6 in the water levels H4 and H5 in the two legs of the vapour lock 78 is equal to the net head around the circuit formed by the primary water coolant circuit and the full pressure emergency core coolant and residual heat removal system. This net head is given (approximately) by the expression:

$$H6 = \left(\frac{\rho_o - \rho_x}{\rho}\right) Z_o + \left(\frac{\rho_o - \rho_D}{\rho}\right) L_2 - \frac{\rho_R}{\rho} H + \left(\frac{\rho_D - \rho_R}{\rho}\right) Z_R$$

where
- $\rho_o$ = water coolant density in the downcomer leg of the full pressure emergency cooling and residual heat removal system (i.e. in tank 58 and second pipe means 68)
- $\rho_x$ = water coolant density in the riser leg of the full pressure emergency cooling and residual heat removal system (i.e. in the first pipe means 74)
- $\rho_D$ = mean water coolant density in the downcomer 26 of the primary circuit
- $\rho_R$ = mean water coolant density in the riser 24 of the primary circuit
- $\rho$ = water coolant density in the pressuriser water space
- $H_R$ = head loss in the reactor core 14 and riser 24 of the primary circuit and the parameters $Z_o$, $Z_R$ and $L_2$ are the dimensions indicated in FIG. 1.

By appropriate choice of the parameters $Z_o$, $L_2$ and $H_R$ (by appropriate core design) the system should be designed such that in normal steady state operation of the reactor plant the first two terms in the above expression for H6 cancel or exceed the core/riser head loss term, i.e. such that $$(\rho_o - \rho_x) Z_o + (\rho_o - \rho_D) L_2 \geqq \rho_R H_R$$

In this event $$H6 \geqq \left(\frac{\rho_D - \rho_R}{\rho}\right)$$

$Z_R$ and the vapour lock 78 will then sense and react to the occurrence of abnormal conditions in the reactor core 14 which are manifested in abnormal water coolant density in the riser 24 of the primary water coolant circuit, such abnormal reactor core conditions give rise to abnormally low water coolant density in the riser 24 and abnormally large water level difference $H_6$ which will disrupt or trip the vapour lock 78.

The water level H4 in the vapour lock 78 of the pipe 74 differs from the pressuriser 46 water level under steady conditions by an amount $H7 = H4 - H1 = H_A$ where $H_A$ = the head loss over the length A of the downcomer passage 26 of the primary water coolant circuit due to flow around the primary water coolant circuit. The level H4 equals the level H2 in the vent pipe 54 to the steam space 50 of the pressuriser 46.

The water level H4 (and hence H5) in the vapour lock 78 approximates to, or bears a close relationship to, the water level 52 in the pressuriser 46. Abnormal water levels in the pressuriser 46 due to excessively high or low reactor core 14 operating temperatures, excessive make up or coolant leaks may also trip the vapour lock 78 to initiate the full pressure emergency core cooling and residual heat removal system.

The head difference $H_6$ between the water levels of the two legs of the vapour lock 78 in the pipe 74 from the primary water coolant circuit to the full pressure emergency core coolant and residual heat removal circuit tank 58 represents the driving head available to initiate an emergency cooling flow of water. If the vapour lock 78 is broken primary water coolant flows from the primary water coolant circuit through the pipe 74, through the full pressure emergency core coolant and residual heat removal tank 58 and through the pipe 68 back into the primary water coolant circuit. The hydrostatic thermal seal formed in the inverted U-bend 82 at the top of the pipe 74 is insufficient to prevent the relatively hot primary water coolant flowing up the pipe 74 from the primary water coolant circuit from entering the tank 58 under emergency conditions.

Once the relatively hot primary water coolant starts to descend through the hydrostatic thermal seal formed by the inverted U-bend 82 it results in an initial slight reduction in the thermal driving head initiating the flow through the full pressure emergency core coolant and residual heat removal system. This characteristic is a stabilising feature requiring a minimum perturbation in the thermal driving head beyond that required to break the vapour lock 78, a smaller perturbation will result in the re-establishment of the vapour lock 78.

When the flow of primary water coolant through the tank 58 is initiated, the temperature of the water in the tank 58 rises and heat transfer to the second heat exchanger cooler 62 starts automatically by natural convection of the coolant fluid from the first heat exchanger cooler 60 via the pipes 66 and 64. Eventually warmer water from the tank 58 descends the pipe 68 to the primary water coolant circuit. The diameters of the pipes 68,74 and the elevation of the full pressure emergency core coolant and residual heat removal tank 58 above the primary water coolant circuit, and the rating of the first and second heat exchanger coolers 60 and 62 must be such as to ensure an adequate cooling flow of water through the reactor core 14 to remove residual heat from the reactor core 14 during emergencies.

To give the facility to shutdown the fission reaction in the rector core 14 in the event of a failure of the first line shutdown systems the tank 58 may contain borated water of sufficient quantity and concentration to make the reactor core 14 subcritical and to maintain the reactor core 14 in a subcritical condition as the reactor core 14 cools down during residual heat removal.

During normal operation of the integral pressurised water reactor 10, the full pressure emergency core coolant and residual heat removal system is in a metastable condition in the sense that it takes a relatively large perturbation to disrupt the vapour lock 78 in the pipe 74. The vapour lock 78 is automatically disrupted during some upset and all accident conditions, but is not disrupted during other upset conditions or during normal plant transients.

Figure 1B:
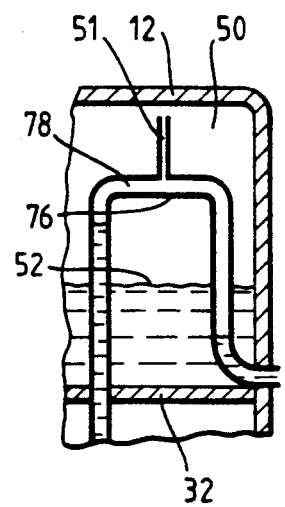
FIG. 1B is an enlarged cross-sectional view of part of FIG. 1 showing a vapour lock in an inverted U-bend.
Figure 1C:
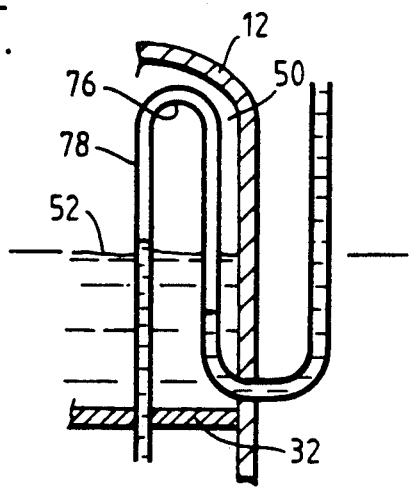
FIG. 1C shows the vapour lock in FIG. 1B when there is a normal steady state operation.
Figure 1D:
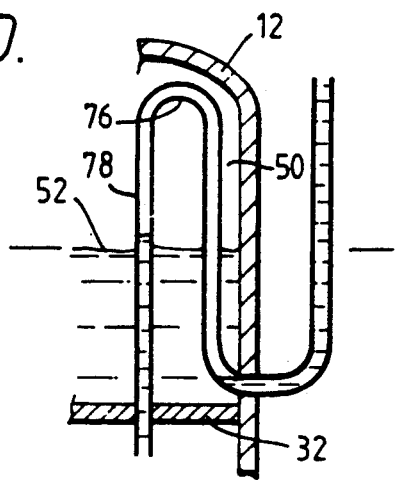
FIG. 1D shows the vapour lock in FIG. 1B when there are abnormal conditions in the riser of the reactor.
Figure 1E:
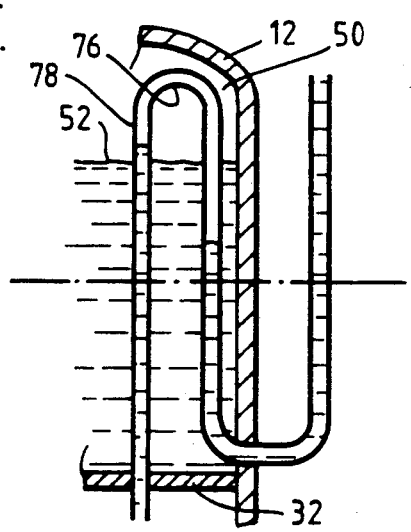
FIG. 1E shows the vapour lock in FIG. 1B when there is a normal pressuriser high water level transient.
Figure 1F:
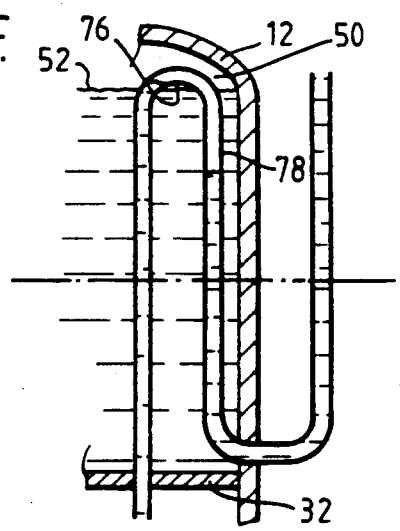
FIG. 1F shows the vapour lock in FIG. 1B when there is an abnormal pressuriser high water level transient.
Figure 1G:
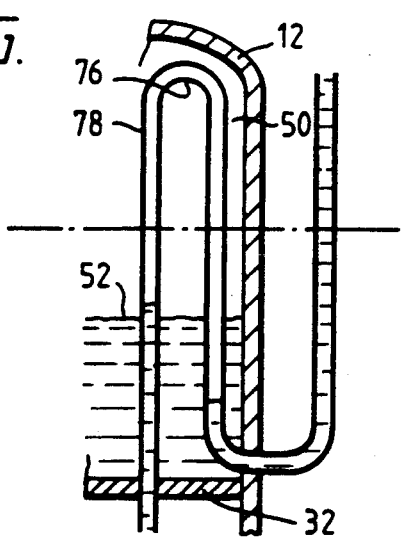
FIG. 1G shows the vapour lock in FIG. 1B when there is a normal pressuriser low water level transient.

The vapour lock 78 is disrupted from the inverted U-bend 76 of the pipe 74 if the water level H4 of the vapour lock reaches the top of the inverted U-bend i.e. $H4 \geq L5$ as shown in FIG. 1F. This may be caused by high water level in the pressuriser 46 due to factors such as excessive make up or excessive operating temperature, or may be caused by high transient primary water coolant temperatures and pressuriser 46 water levels resulting from reactivity addition accidents or following load rejection, station blackout or other positive power imbalance abnormalities.

Figure 1H:
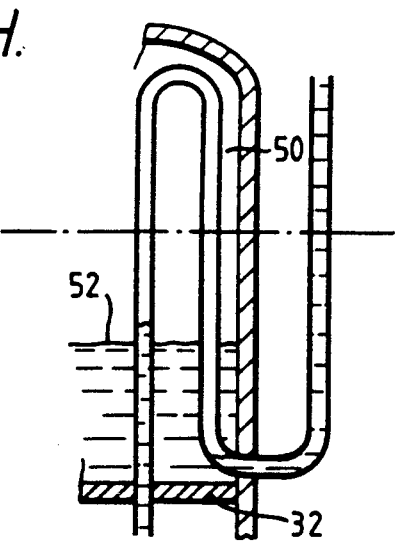
FIG. 1H shows the vapour lock in FIG. 1B when there is an abnormal pressuriser low water level transient.

The vapour lock 78 is disrupted from the inverted U-bend 76 of the pipe 74 if the water level H5 of the vapour lock falls low enough to uncover the U-bend 80 in the pipe 74 i.e. $H5 \leq L3$ as shown in FIG. 1D and 1H. This may be caused by low water level in the pressuriser 46 due to factors such as a primary water coolant leak or an abnormally low operating temperature and pressure, or may be caused by low transient primary water coolant temperatures and pressuriser 46 water levels during the initial stages of secondary steam pipe rupture or other excessive steam demand accidents or during feed water addition accidents, or may be caused by a high full pressure emergency core cooling and residual heat removal system nett thermal driving head H6 due to adverse thermal conditions in the reactor core 14 and riser 24 of the primary water coolant circuit due to such factors as reactor coolant pump trip, reactor core flow blockage, reactor core overpower conditions.

The vapour lock 78 is disrupted from the inverted U-bend 76 of the pipe 74 if a vapour bubble forms or develops in the primary water coolant circuit of sufficient size or volume to uncover the inlet of the pipe 74 in the primary water coolant circuit. This may occur if saturation conditions are reached in the riser 24 of the primary water coolant circuit due to loss of pressure caused by loss of pressuriser 46 heaters or by a steam leak from the pressuriser 46, or due to a large primary water coolant leak, or due to a very large negative primary water coolant volume surge caused by a secondary steam pipe rupture or other excessive steam demand accidents.

The parameters of the vapour lock 78 which determine the vapour lock disruption or trip conditions are, its height L5, the elevation of the U-bend 80 at the exit from the pressure vessel L3, the depth B of penetration of the pipe 74 into the primary water coolant circuit, and the disposition of these parameters to the normal and accident condition water levels in the pressuriser 46. These parameters are chosen to discriminate between variations in the pressuriser 46 water level and full pressure emergency core cooling and residual heat removal system nett thermal driving head H6 caused by accident or upset conditions when the vapour lock 78 is required to trip, and variation during normal transients or upset conditions for which the vapour lock 78 is required to remain intact.

In normal transient operation primary water coolant is exchanged between the primary water coolant circuit and the pressuriser 46 which acts as a surge tank for the primary water coolant circuit. An increase in temperature in the primary water coolant circuit resulting in a positive volume surge, will tend to increase the water levels in the vapour lock 78 of the pipe 74 just as it increases the water level in the pressuriser 46. The height L5 of the pipe 74 must be great enough to prevent the level H4 rising to the top of the inverted U-bend 76 thus breaking the vapour lock 78 in normal transients.

In a rapid positive volume surge there is a tendency for the steam space 50 of the pressuriser 46 to be compressed into the superheat region resulting in higher transient pressures than would occur if superheating of the steam space 50 is prevented. The vent pipes 54 interconnecting the primary water coolant circuit and the pressuriser 46 steam space 50 allow a desuper-heating spray of primary water coolant into the steam space 50 from the primary water coolant circuit driven by the power imbalance on the primary water coolant causing the positive volume surge.

The vapour in the vapour lock 78 of the pipe 74 leading to the tank 58 will be compressed into the superheat region in a large rapid transient which may disrupt the vapour lock 78. The higher pressures in the vapour lock 78 due to superheating act against the rise in water levels H4 and H5 counteracting the tendency to break or reduce the vapour lock 78 margin. In FIG. 1 the inverted U-bend 76 and vapour lock 78 is positioned in the pressuriser 46, and sprayed primary water coolant from the vent pipes 54 may flow over the inverted U-bend 76 causing heat transfer from the vapour lock 78 reducing the tendency of the vapour in the vapour lock 78 to be compressed into superheat. Reduction of superheat in the vapour lock 78 may or may not be desirable in large volume surges produced by accidents such as full load rejection.

During a negative volume surge primary water coolant flows from the water space 48 of the pressuriser 46 through the surge ports 56 into the primary water coolant circuit lowering the water level in the pressuriser 46. The pressure in the system tends to be maintained by saturated water in the pressuriser 46, and elsewhere, flashing to vapour due to a transient drop in pressure resulting from the negative volume surge. Likewise the water levels in the vapour lock 78 of the pipe 74 fall during a negative volume surge and a tendency for water in the legs of the inverted U-bend 76 to flash to vapour also exists. The flashing of the water to vapour is accompanied by a reduction in the temperature of the water while the vapour produced reinforces the vapour lock 78. The depth L3 of the U-bend 80 in the pipe 74 must be great enough to preclude the water level H5 from dropping far enough to break or impair the vapour lock margin during normal negative surge transients.

One potential problem with the vapour lock 78 is the possibility that incondensible gases, such as oxygen or hydrogen resulting from radiolytic decomposition of the primary coolant in the reactor core 14, may gather in the vapour lock 78 and impair its operation. To prevent the build up of such incondensible gases a small vent 51 may be provided (as illustrated the FIG. 1b) at the top of the first inverted U-bend 76. This will release incondensibles into the pressuriser steam space 50 when the pressuriser steam space is routinely degased. Such a vent 51 will not influence the steady state conditions of the vapour lock 78. The vent 51 may be sized to be very small or of capillary dimensions so as to have a negligible influence on the transient performance of the vapour lock.

To facilitate degassing of the vapour lock 78 a small electrical immersion heater may be positioned in the inverted U-bend 76 to promote a slow flow rate of vapour and gas through the vent 51 into the pressuriser steam space 50.

Figure 1I:
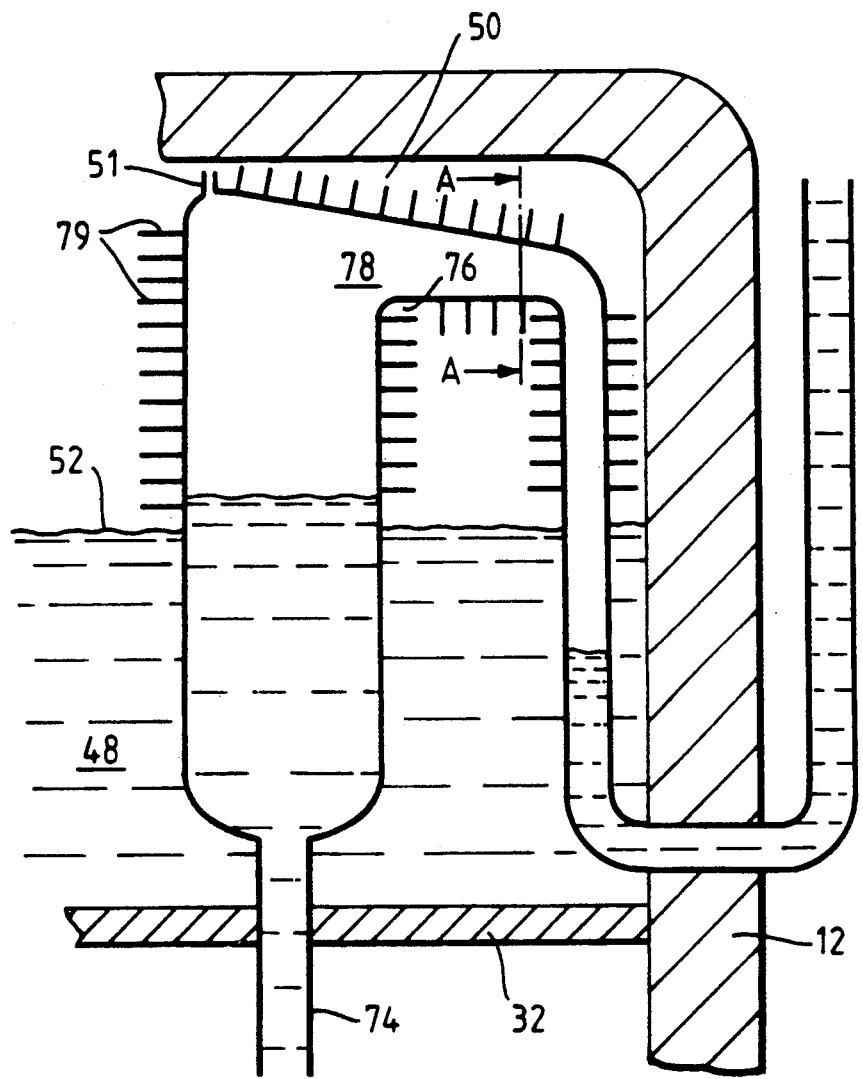
FIG. 1I shows an enlarged cross-sectional view of an alternative vapour lock and inverted U-bend.
Figure 1J:
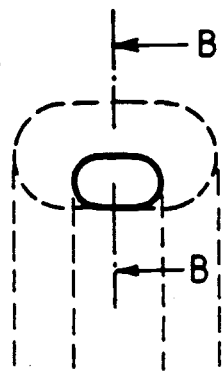
FIG. 1J is a sectional view in the direction of arrows A in FIG. 1I.

The vapour lock 78 is self regulating, in that it is created automatically during the reactor plant start up and is subsequently maintained intact during normal steady state and normal transient operation. The pressuriser 46 creates and subsequently maintains the vapour lock 78 because of the tendency of communicating systems to move towards thermodynamic equilibrium. The inverted U-bend 76 and vapour lock 78 geometry may be arranged to promote the creation and maintenance of the vapour lock 78 by facilitating energy and mass transfers between the pressuriser 46 and the vapour lock 78. To enhance heat transfer between the pressuriser 46 and the vapour lock 78, the inverted U-bend 76 may be provided with a plurality of heat transfer fins 79 as shown in FIG. 1I. To enhance mass and enthalpy transfer between the pressuriser 46 and the vapour lock 78, the inverted U-bend 76 may be provided with a small vent 51 as shown in FIG. 1B. This will promote pressure and water level equalisation of the vapour lock 78 with the pressuriser 46 following perturbations. However these features are designed to ensure that mass and energy transfers between the pressuriser 46 and the vapour lock 78 are not so rapid as to prevent the vapour lock 78 from being displaced, or to cause it to be reformed during trip conditions.

A small immersion heater may be provided to assist in the formation and maintenance of the vapour lock.

To facilitate displacement of the vapour lock 78 during trip conditions the inverted U-bend 76 may be designed to promote entrainment of vapour or incondensible gas bubbles once trip conditions prevail. The inverted U-bend 76 in FIG. 1I is shaped to enhance the entrainment of the vapour or gas bubbles. The upstream leg of the inverted U-bend 76 is larger in diameter, or area, than the downstream leg, while the top of the inverted U-bend tapers towards the entrance to the downstream leg. This promotes an increasing fluid velocity as primary water coolant flows through the inverted U-bend enhancing the tendency for gas or vapour bubbles to be entrained.

Figure 2:
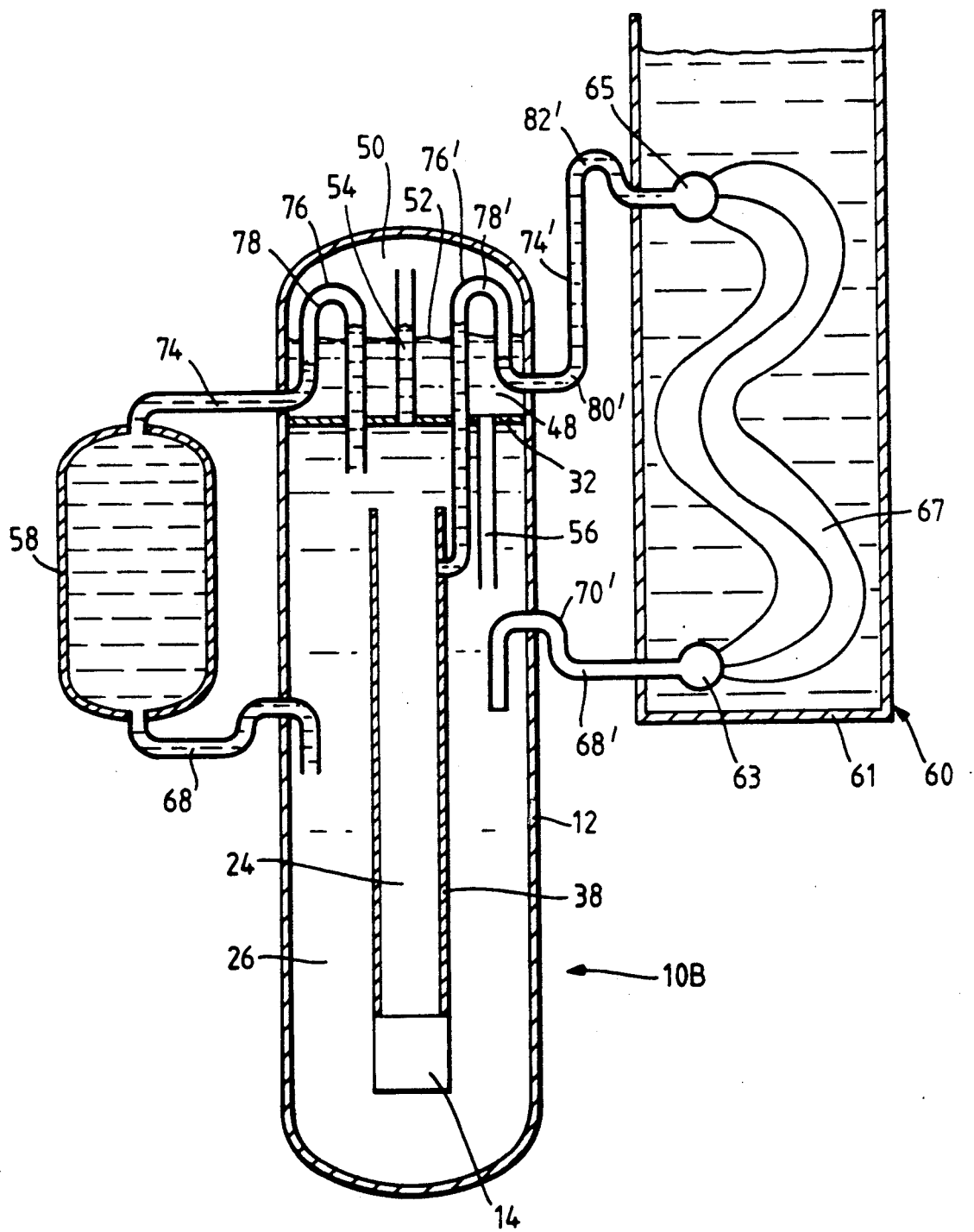
FIG. 2 is a vertical cross-sectional diagrammatical view of a second embodiment of an integral water cooled nuclear reactor with integral pressuriser and separate full pressure emergency core cooling and residual heat removal system according to the present invention.

FIG. 2 shows an alternative embodiment of an integral pressurised water reactor (PWR) 10B of the type with an integral pressuriser and is substantially the same as the embodiment shown in FIG. 1, and like parts are denoted by like numerals.

In this embodiment the full pressure emergency core coolant tank and the full pressure residual heat removal system are in separate circuits, each circuit has its own vapour lock and connecting conduits.

At least one full pressure emergency core coolant tank 58 is provided. Each full pressure emergency core coolant tank 58 is positioned at an elevation higher than the reactor core 14, and preferably at an elevation higher than the pressure vessel 12. A pipe 74 interconnects an upper portion of the primary water coolant circuit in the pressure vessel 12 with an upper portion of the full pressure emergency core coolant tank 58. The pipe 74 extends through the casing 32 into the pressuriser 46, and the pipe 74 incorporates a first inverted U-bend 76 which passes through the water space 48 and steam space 50 of the pressuriser 46 to form a vapour lock 78 within the inverted U-bend 76.

One or more pipes 68 interconnect the lower portion of the full pressure emergency core coolant tank 58 with a lower portion of the primary water coolant circuit, in this example the downcomer 26 below the heat exchangers 42. The pipes 68 incorporate an inverted U-bend 70 at its entrance to the pressure vessel 12 to form a hydrostatic thermal seal preventing thermal convection currents from the primary water coolant circuit to the main portion of the pipe 68 and the full pressure emergency core coolant tank 58.

At least one full pressure residual heat removal system is also provided. Each full pressure residual heat removal system comprises a heat exchanger 60 positioned at an elevation at least as high as the heat exchanger 42, and preferably at an elevation higher than the pressure vessel 12. The residual heat removal heat sink is a large tank 61 containing water. Alternatively the residual heat removal heat sink may be a heat exchanger with a heat transport coolant. The residual heat removal heat exchanger 60 comprises a bank of tubes 67 immersed in the water in tank 61. The bank of tubes 67 has an inlet header 65 and an outlet header 63 for the efficient distribution of primary water coolant between the tubes 67. A pipe 74' interconnects an upper portion of the primary water coolant circuit in the pressure vessel 12 with the inlet header 65 of the tube bank 67. The pipe 74' extends through the casing 32 into the pressuriser 46, and the pipe 74' incorporates a first inverted U-bend 76' which passes through the water space 48 and steam space 50 of the pressuriser 46 to form a vapour lock 78' within the first inverted U-bend 76'. The pipe 74' also has a U-bend 80' and a second inverted U-bend 82'. The second inverted U-bend 82' is at a suitably high elevation outside the pressure vessel 12 before the pipe 74' enters the tank 61. The second inverted U-bend 82' forms a hydrostatic thermal seal to prevent eddy currents of warm water circulating in the pipe 74' during normal operation of the reactor plant entering the full pressure residual heat removal heat exchanger 60 tubes 67.

One or more pipes 68' interconnect the outlet header 63 of the full pressure residual heat removal heat exchanger 60 tubes 67 with a lower portion of the primary water coolant circuit, in this example the downcomer 26 below the heat exchanger 42. The pipe 68' incorporates an inverted U-bend 70' at its entrance to the pressure vessel 12 to form a hydrostatic thermal seal preventing thermal convection currents from the primary water coolant circuit to the main portion of the pipe 68' and tubes 67.

The full pressure emergency core coolant tank 58 is alongside the pressure vessel 12, and thermal eddy currents in the exposed pipe 74 are precluded by the absence of a rising section of pipe 74. If the tank 58 is located at a higher elevation the exposed rising section of the pipe 74 would require an inverted U-bend to prevent eddy currents from circulating in the full pressure emergency core coolant tank 58, as in FIG. 1.

The casing 32 in this embodiment is a diaphragm casing.

The operation of the vapour locks 78 and 78' is substantially as described with respect to FIG. 1. However, separation of the full pressure emergency core coolant system from the residual heat removal system enables the trip points of the two vapour locks 78 and 78' to be designed for different events. The vapour lock 78 for the full pressure emergency core coolant tank 58 may be set to trip, be displaced, on low pressuriser 46 or primary water coolant circuit water levels by the elevation of the entrance of the pipe 74 within the pressure vessel 12. In this example the entrance of the pipe 74 is directly connected to the primary water coolant circuit.

Low water levels may be occasioned by loss of coolant from the primary water coolant circuit due to coolant leaks through breaks in ancillary pipework or breaks in the pressure vessel 12. The full pressure emergency core coolant system provides a rapid source of make up water for small, intermediate or large leaks depending on the size of the tank 58 and the interconnecting pipe 68 and 74.

The full pressure residual heat removal system vapour lock 78' may be set to trip, be displaced, upon excessively high pressuriser water level 52 and upon excessively high net head across the vapour lock 78'. High water levels may be caused by loss of heat sink accidents and high net head across the vapour lock 78' may be caused by loss of reactor cooling pump accidents.

Figure 3:
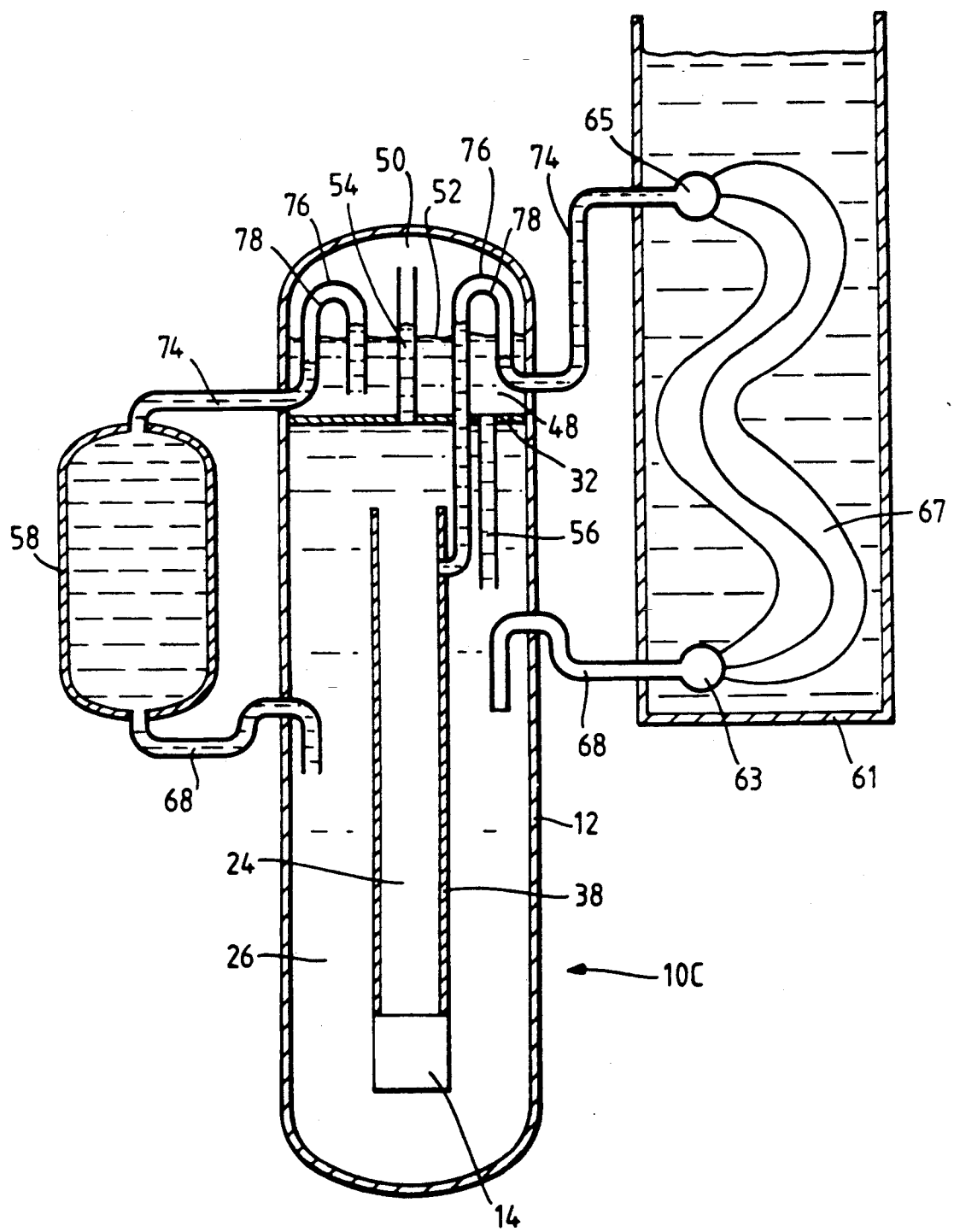
FIG. 3 is a vertical cross-sectional diagrammatical view of a third embodiment of an integral water cooled nuclear reactor with integral pressuriser and separate full pressure emergency core cooling and residual heat removal system according to the present invention.

FIG. 3 shows an integral pressurised water reactor 10C and is substantially the same as the embodiment shown in FIG. 2, and like parts are denoted by like numerals. This embodiment differs from FIG. 2 in that the pipe 74 which interconnects the upper portion of the full pressure emergency core coolant tank 58 and the primary water coolant circuit, has an entrance above the casing 32 in the pressuriser 46 water space 48.

Figure 4:
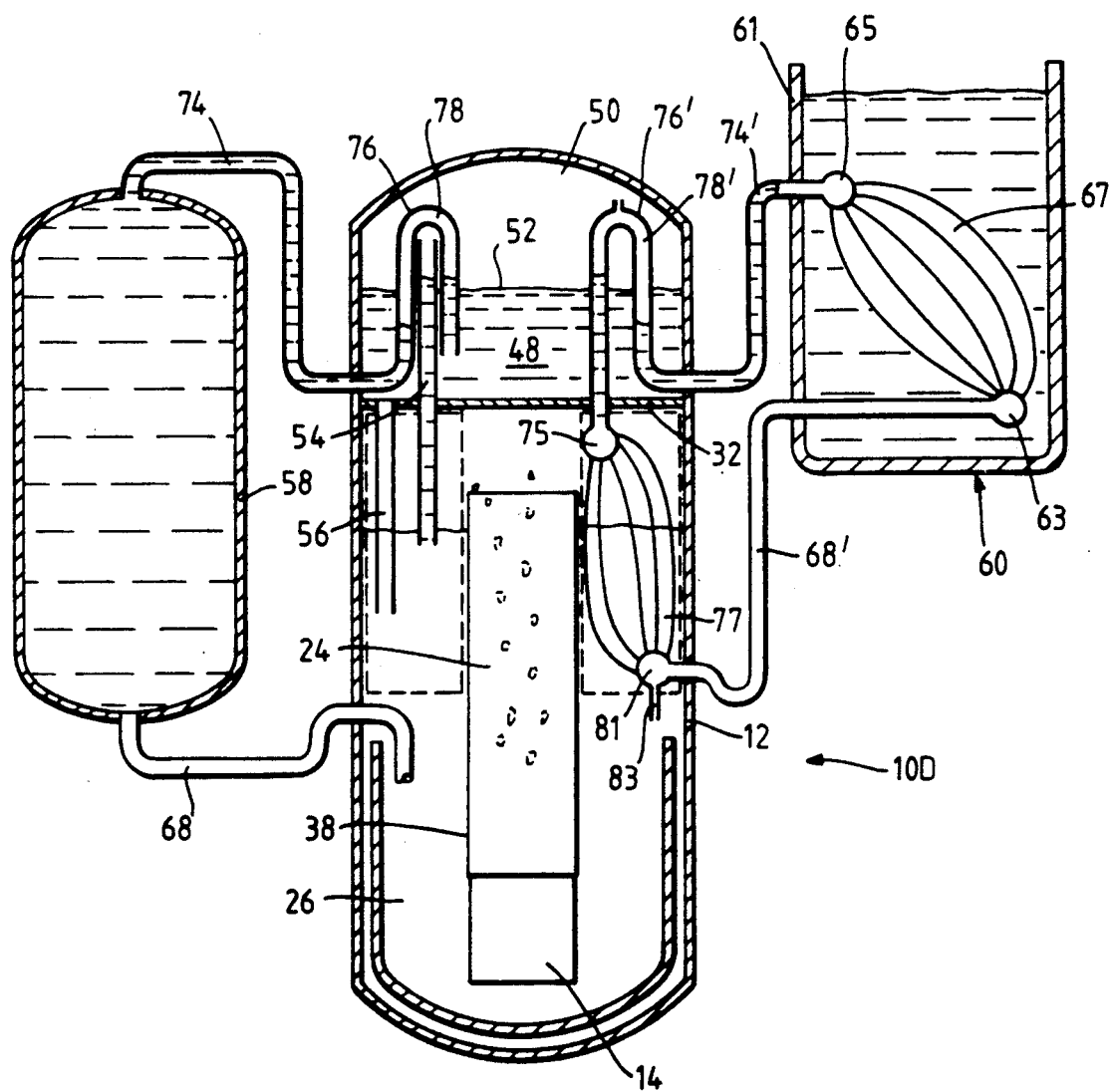
FIG. 4 is a vertical cross-sectional diagrammatical view of a fourth embodiment of an integral water cooled nuclear reactor with integral pressuriser and separate full pressure emergency core cooling and residual heat removal system according to the present invention.

FIG. 4 shows an integral indirect boiling water reactor (BWR) described more fully in our copending U.K. patent application 8808707.7. In this embodiment the casing 32 is a diaphragm casing.

The full pressure emergency core coolant tank system and the full pressure residual heat removal systems of FIG. 2 are incorporated in FIG. 4 and like parts are denoted by like numerals.

It differs from FIG. 2 in that the pipe 74' containing the vapour lock 78', and the pipe 68' are interconnected by a bank of heat exchanger tubes 77 positioned within the upper part of the downcomer 26 of the primary water coolant circuit. This bank of heat exchanger tubes 77 fluidly communicates with the pipe 74' via an outlet header 75, and the heat exchanger tubes 77 fluidly communicate with the pipe 68' via an inlet header 81. The bank of heat exchanger tubes 77, the outlet header 75, the pipe 74', the residual heat removal heat exchanger 60, the pipe 68' and the inlet header 81 form a closed circuit for the circulation of residual heat removal water coolant.

Pressurisation of this circuit is provided by the primary water coolant circuit and pressuriser 46 via a small diameter orifice 83 from the inlet header 81 of the heat exchanger tubes 77 to the downcomer 26 of the primary water coolant circuit.

During normal operation of the reactor plant the full pressure residual heat removal system is full of water at the pressure corresponding to that at the pressurising orifice 83. However the water in the full pressure residual heat removal system is prevented from circulating by the vapour lock 78'. During abnormal conditions the vapour lock 78' is displaced allowing the water to circulate through the full pressure residual heat removal system, i.e. through the heat exchanger 77, the pipe 74', the heat exchanger 67 and the pipe 68'.

The vapour lock 78' of the full pressure residual heat removal system may be tripped by excessively high or low pressuriser water levels.

In the event of the vapour lock 78' tripping due to low pressuriser water level, two phase heat transfer and flow occurs in the full pressure residual heat removal system, with evaporation occuring within the heat exchanger tubes 77 and condensation occuring within the heat exchanger tubes 67.

The full pressure residual heat removal system of FIG. 4 has an advantage over that in FIG. 3 in that in the event of a leak in the pipework of the full pressure residual heat removal system the rate of loss of primary water coolant is limited by the small diameter of the pressurising orifice 83.

Figure 5:
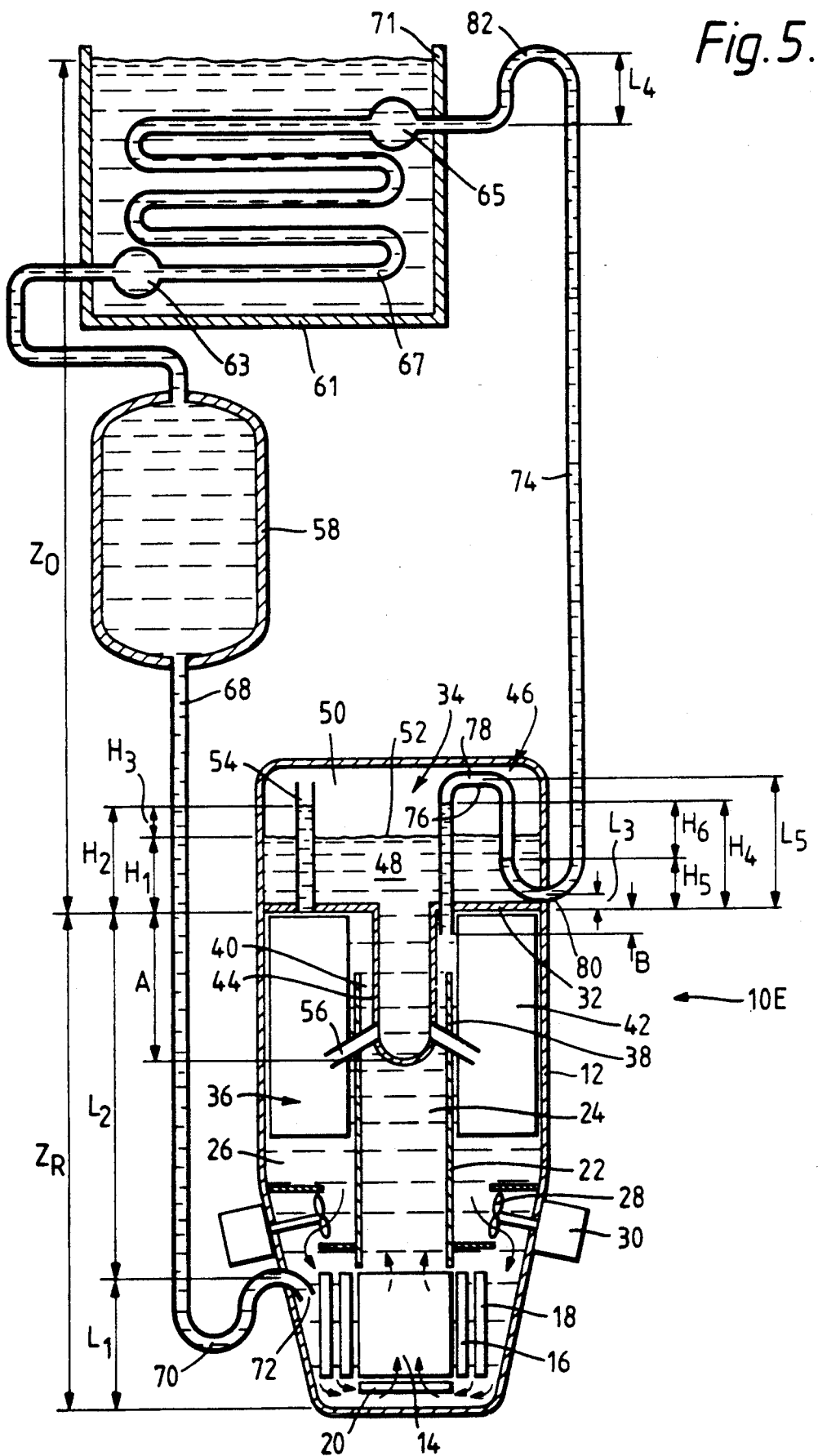
FIG. 5 is a vertical cross-sectional diagrammatical view of a fifth embodiment of an integral water cooled nuclear reactor with integral pressuriser and seperate full pressure emergency core cooling and residual heat removal system according to the present invention.

In FIG. 5 a full pressure emergency core coolant tank is separate from the residual heat removal heat exchanger. The primary water coolant is cooled by passing through a separate heat exchanger or through a large volume of water coolant at low pressure and temperature in a residual heat removal tank 61. The pipe 74 leads to a heat exchanger section in series between the second inverted U-bend 82 and the full pressure emergency core coolant tank 58, which passes through the residual heat removal tank 61. The heat exchanger section has a bank of cooling tubes 67 which extend between an inlet header 65 and an outlet header 63. Residual heat removed from the reactor core via the primary water coolant is transferred to the water in the tank 61, and this causes the water in the tank 61 to boil off. The tank 61 may equally well be provided with a cooling circuit to remove heat from the water in the tank 61 to prevent or minimise boil off.

Figure 6:
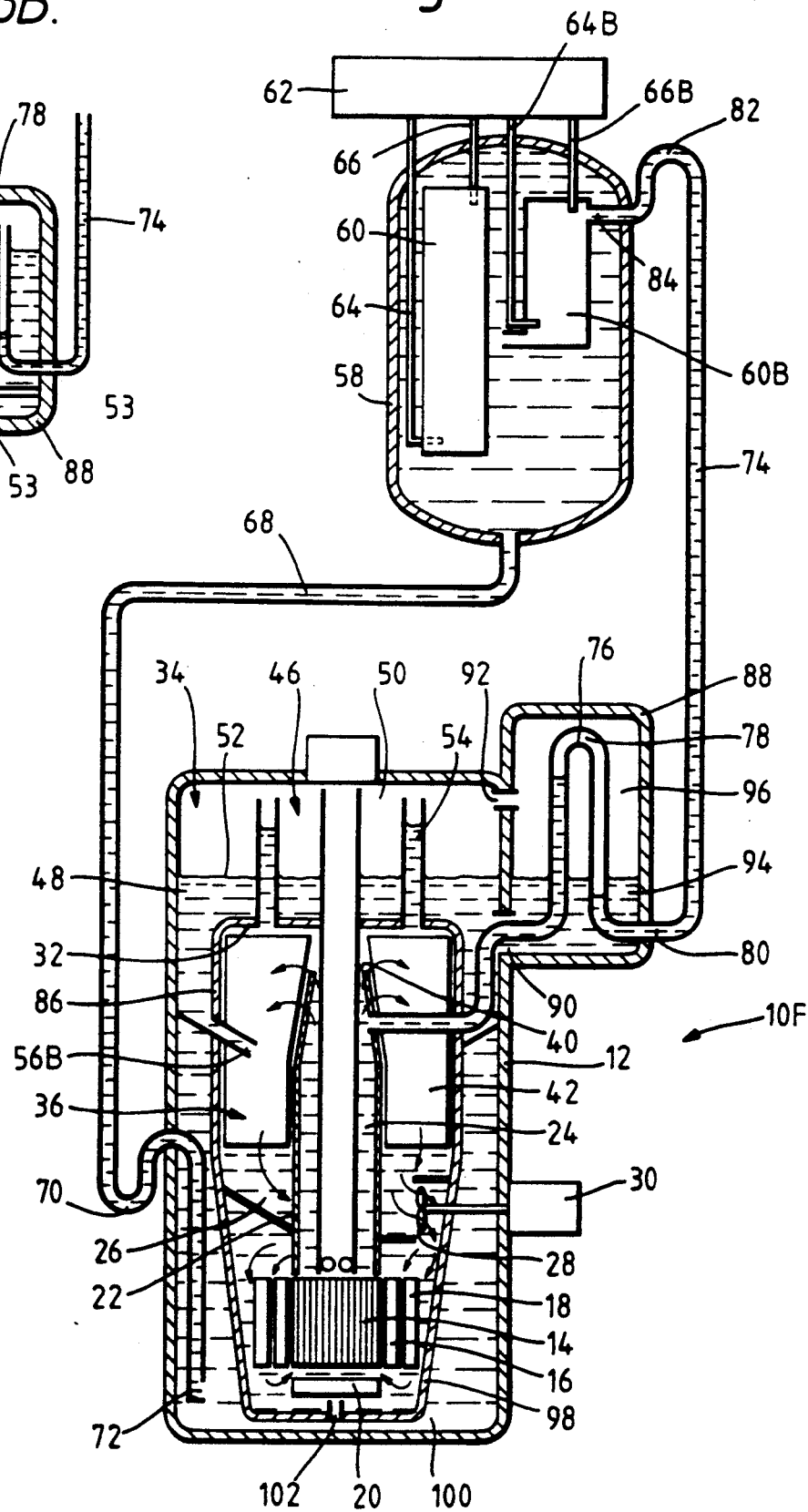
FIG. 6 is a vertical cross-sectional diagrammatical view of a sixth embodiment of an integral water cooled nuclear reactor with seperate integral pressuriser and separate full pressure emergency core cooling and residual heat removal system according to the present invention.

FIG. 6 shows an integral pressurised water reactor (PWR) 10F of the type with an integral pressuriser and is substantially the same as the embodiment shown in FIG. 1, and like parts are denoted by like numerals. It differs in that the casing 32 has an annular member 86 which extends vertically downwards from the peripheral region of the casing 32, and the bottom region of the annular member 86 is secured and sealed to the pressure vessel 12 just beneath the surge ports 56B. Surge ports 56B interconnect the water space 48 of the pressuriser 46 with a lower portion of the primary water coolant circuit.

The pressuriser 46 also has an auxiliary vessel 88, and the auxiliary vessel 88 is interconnected with the main pressuriser 46 by pipes 90, or apertures which interconnect the water space 48 of the pressuriser 46 with a water space 94 of the auxiliary vessel 88 and pipes 92, or apertures which interconnect the steam space 50 of the pressuriser 46 with a steam space 96 of the auxiliary vessel 88. The inverted U-bend 76 of the pipe 74 and vapour lock 78 pass through the auxiliary vessel 88 of the pressuriser 46 rather than the main vessel. It would be possible to arrange the auxiliary vessel 88 to interconnect only with the water space of the pressuriser 46, or with an upper portion of the primary water coolant circuit beneath the pressuriser 46. The auxiliary vessel may be provided with electrical immersion heaters in the water space 94 to augment or create the steam space 96.

Figure 6B:
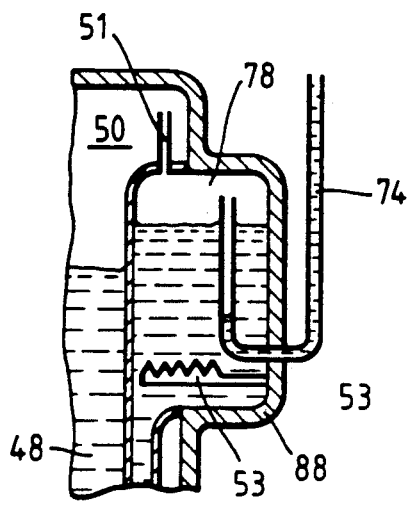
FIG. 6B is an enlarged cross-sectional view of part of FIG. 6 showing an alternative vapour lock.

The auxiliary vessel may itself perform the function of the inverted U-bend, the steam space produced with its own immersion heater 53 forming the vapour lock as illustrated in FIG. 6B. A small vent 51 from the vapour lock to the pressuriser steam space may be provided to vent excess vapour and incondensibles from the vapour lock 78 to the pressuriser steam space 50.

The pipe 74 interconnects with an enclosed region 84 of the full pressure emergency core cooling and residual heat removal tank 58 before discharging into the main tank 58. The enclosed region 84 has one of the first heat exchanger coolers 60B which is fluidly connected to the second heat exchanger cooler 62 via pipes 64B and 66B. This reduces thermal shocks on the tank 58, and promotes rapid heat transfer to the second heat exchanger cooler 62.

The pressure vessel 12 has a second casing 98 positioned therein in the second vertically lower chamber 36 which encloses the reactor core 14 and defines a portion of the annular downcomer passage 26 instead of the pressure vessel 12. The casing 98 is spaced from the pressure vessel 12 to form a water filled chamber 100. The bottom of the casing 98 has a port 102 for the flow of primary water coolant between the chamber 100 and the primary water coolant circuit. The pipe 68 interconnects the tank 58 and the chamber 100. The use of the additional casing 98 reduces thermal shocks on the pressure vessel 12 during normal operation. Water from the tank 58 enters the main primary water coolant circuit below the reactor core 14. To reduce thermal shocks on the pressure vessel 12 during emergency core cooling and residual heat removal system operation the termination 72 of the pipe 68 may be located in the port 102. The water in the chamber 100 forms an outer thermal shield or biological shield reducing the neutron dose at the pressure vessel 12 and beyond.

In this embodiment the vapour lock 78 in pipe 74 is located in an auxiliary vessel 88 which communicates with the steam space 50 and water space 48 of the pressuriser 46 by the pipes 92 and 90 or by apertures. The steady state and slow transient conditions in the auxiliary vessel 88 are similar to those in the pressuriser 46. Saturation conditions prevail and the water level formed in the auxiliary vessel is at the same elevation as that in the pressuriser 46. Spray from the pressuriser 46 steam space 50 is prevented from entering, or its entry is controlled, by the location and design of the pipes 90 and 92. These pipes may also be designed to restrict transient flow between the pressuriser 46 and the auxiliary vessel 88. Thus the vapour lock 78 is relatively isolated from transient conditions in the pressuriser 46 allowing the tendency to compress the vapour lock 78 into superheat to reduce the tendency of a rapid large positive volume surge to break or reduce the vapour lock margin i.e. in this arrangement the desuperheating of the vapour lock during primary coolant volume surges is prevented.

The embodiment in FIG. 6 could be used with the separate full pressure emergency core coolant tank 58 and separate residual heat removal tank 61 shown in FIG. 2.

Figure 7:
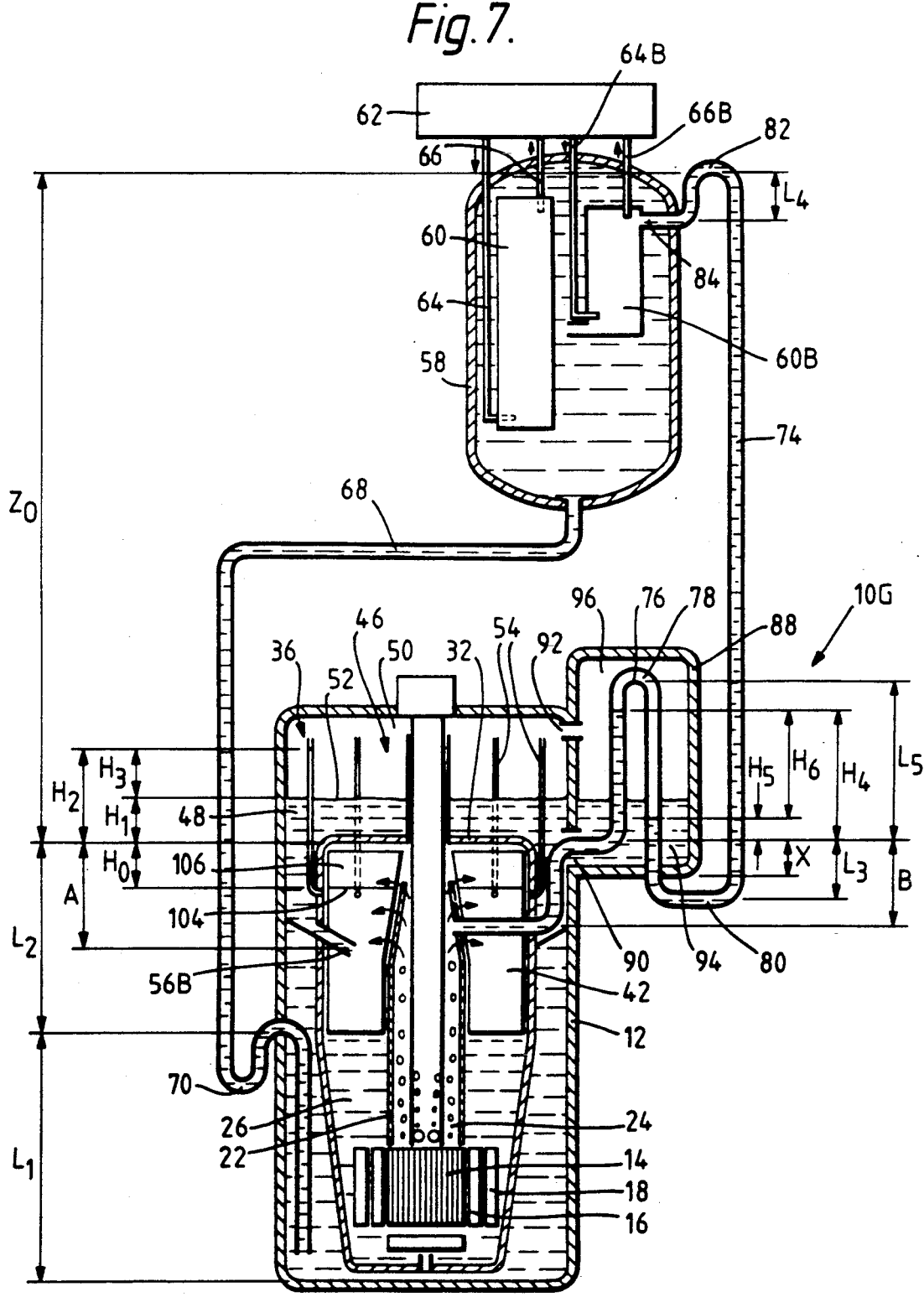
FIG. 7 is a vertical cross-sectional diagrammatical view of a seventh embodiment of an integral water cooled nuclear reactor with integral pressuriser and separate full pressure emergency core cooling and residual heat removal system according to the present invention.

FIG. 7 shows an integral indirect cycle boiling water reactor (BWR) 10G of the type with an integral pressuriser and is substantially the same as the embodiment shown in FIG. 6 and like parts are denoted by like numerals. It differs in that the vent pipes 54 interconnect the steam space 50 of the pressuriser 46 with an upper portion of the primary water coolant circuit below the normal operating range of effective water levels in the primary water coolant circuit.

Condensing heat transfer from the primary water coolant and bulk boiling in the reactor core is facilitated in the BWR variant but is prevented in the PWR. In the water cooled indirect cycle boiling water nuclear reactor an upper portion of the heat exchanger 42 protrudes above an effective water level 104 within the primary water coolant circuit into a steam space 106 defined by the casing 32, whereas in the water cooled PWR nuclear reactor the primary water coolant circuit below the casing 32 is completely flooded.

The pipe 74 interconnecting the tank 58 and an upper portion of the primary water coolant circuit interconnects with the primary water coolant circuit, i.e. the riser 24 below the normal operating range of effective water levels 104 in the primary water coolant circuit. The pipe 74 may equally well interconnect with the downcomer 26 below the normal water levels. The pipe 74 leaves the auxiliary vessel vertically to form a U-bend 80 creating an additional hydrostatic thermal seal preventing thermal convection currents in the pipe 74. The pipe 74 could be arranged to leave the auxiliary vessel horizontally as in FIG. 3 to promote thermal convection currents in the pipe 74.

The main difference between the PWR and BWR is that the BWR variant is more likely to involve two phase flow, i.e. water and vapour, through the pipe 74 from the primary water coolant circuit to the tank 58 and condensing heat transfer will occur in the tank 58. The pipe 74 and first heat exchanger coolers 60,60B will be designed for two phase flow and heat transfer.

During normal operation of the integral boiling water reactor the full pressure emergency core cooling and residual heat removal system is in a metastable condition in the sense that it takes a sufficiently large perturbation to disrupt the vapour lock 78 in the pipe 74 from upper portion of the primary water coolant circuit to the tank 58. The system is designed such that the vapour lock 78 is automatically disrupted during some upset and all accident and emergency conditions but is not disrupted during other upset conditions or during normal plant transients.

The vapour lock 78 is disrupted from the inverted U-bend 76 of the pipe 74 if the water level H4 of the vapour lock 78 reaches the top of the inverted U-bend i.e. H4≧L5. This may be caused by high water level 52 (H1) in the pressuriser 46 due to factors such as excessive make up or excessive operating temperature or pressure, or may be caused by high transient primary water coolant circuit temperatures and pressures and effective water levels 104 ($H_o$) resulting from reactivity addition accidents or following load rejection, station blackout or other positive power imbalances (i.e. when the conditions in the primary water coolant circuit and pressuriser are sufficiently different), or may be caused by a relatively high emergency core cooling and residual heat removal circuit net thermal driving head H6 due to adverse thermal conditions in the reactor core 14 and riser 24 of the primary water coolant circuit produced by events such as reactor coolant pump trip, reactor core flow blockage, reactor core overpower conditions, excessive reactor core boiling and riser voidage or may be caused by a leak from the pressuriser 46.

The vapour lock 78 is disrupted from the inverted U-bend 76 of the pipe 74 if the water level H5 in the vapour lock 78 falls low enough to uncover the U-bend 80 in the pipe 74 i.e. H5<L3. This may be caused by a low water level H1 in the pressuriser 46 due to factors such as a primary water coolant leak or abnormally low operating temperature, or may be caused by low transient primary water coolant temperatures and pressuriser 46 water levels during the initial stages of secondary steam pipe break or other excessive steam demand accidents or feed water accidents or may be caused by a high emergency core cooling and residual heat removal system net thermal driving head H6 due to adverse thermal conditions in the reactor core 14 and riser 24 of the primary water coolant circuit due to such factors as reactor coolant pump trip, reactor core flow-blockage, reactor core overpower condition or excessive boiling in the reactor core and excessive voidage in the riser 24 or may be caused by a leak from the primary water coolant circuit.

The vapour lock 78 is disrupted from the inverted U-bend 76 of the pipe 74 if the effective water level in the primary water coolant circuit falls below the inlet to the pipes 74 from an upper portion of the primary water coolant circuit to the tank 58. This may be caused if a leak develops in the primary water coolant circuit or the pressuriser 46, or may be caused during the initial stages of a rapid negative volume surge such as may result from a secondary steam pipe break or other excessive steam demand accidents or feed water addition accidents or may be caused during a prolonged positive power imbalance such as may occur during continuous slow reactivity addition or following load rejection and station blackout.

The design parameters which determine the tip conditions of the vapour lock 78 are its height L5, its depth L3, its inlet elevation B and the disposition of these relative to the normal and abnormal water levels in the pressuriser 46 and the primary water coolant circuit. These parameters are chosen to discriminate between normal variations of the water levels H4 and H5 in the vapour lock 78, which should not trip the vapour lock 78, and those abnormal variations during accident or upset conditions which should trip the vapour lock 78 to initiate a flow of water through the full pressure emergency core cooling and residual heat removal system.

Behaviour of the vapour lock 78 during normal plant operation will be qualitatively similar to the integral pressurised water reactors of FIGS. 1 to 3, however the presence of voidage in the primary water coolant circuit and the fact that saturation conditions prevail over a substantial volume of the primary water coolant circuit make the behaviour of the integral boiling water reactor quantitatively different.

The embodiment of integral BWR in FIG. 4 could be used with the separate full pressure emergency core cooling tank 58 and separate low pressure residual heat removal tank 61 shown in FIG. 2.

Figure 8:
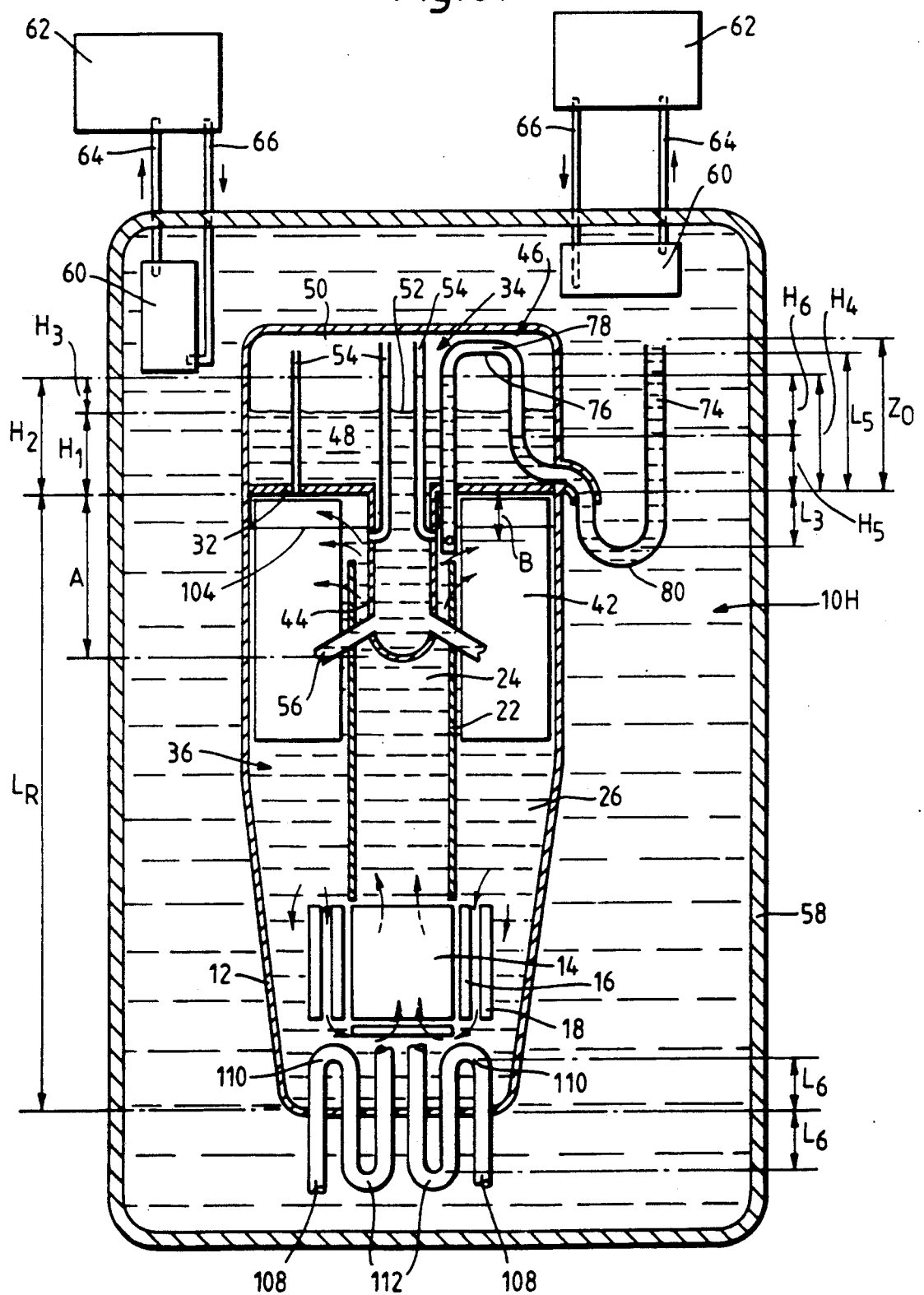
FIG. 8 is a vertical cross-sectional diagrammatical view of an eighth embodiment of an integral water cooled nuclear reactor with integral pressuriser and integral full pressure emergency core cooling and residual heat removal system according to the present invention.

FIG. 8 shows an integral indirect cycle boiling water reactor 10H (IBWR) of the type with an integral pressuriser and is substantially the same as the embodiment shown in FIG. 1 and like parts are denoted by like numerals. It differs in that some of the vent pipes 54 protrude into the primary circuit below the level of the casing 32 to facilitate the formation of a steam space and effective water level 104 in the primary circuit to promote condensing heat transfer in the steam generator 42 and bulk boiling in the reactor core 14. The enhanced potential for natural circulation resulting from vapour flow in the core 14 and riser 24 may allow the reactor coolant pumps to be dispensed with.

This embodiment also differs from that in FIG. 1 in that the "pressure" vessel 12 together with its contents are positioned wholly within the combined full pressure emergency core cooling and residual heat removal tank 58 and the wall of the tank 58 now forms the actual, integral pressure vessel. The "pressure" vessel 12 now forms a low pressure difference boundary preventing mixing between the water in the primary water coolant circuit and the pressuriser 46 with the water in the tank 58. The vessel 12 may contain thermal insulating material in its walls so that the primary water coolant in the primary water coolant circuit and pressuriser operate at a substantially higher temperature than the water in the tank 58 without excessive heat loss from the primary water coolant to the water in the tank 58.

The tank 58 contains the first heat exchanger coolers 60 positioned at the uppermost region of the tank 58 which maintain the tank 58 at a low temperature during normal operation of the reactor plant within and to remove residual heat from the reactor plant during emergency conditions. Heat is conducted to the heat exchanger coolers 60 by natural circulation of the water within the tank 58 by natural convection.

The one or more pipes 74 again interconnect an upper portion of the primary water coolant circuit with an upper portion of the tank 58. The at least one pipe 74 has an inverted U-bend 76 positioned in the pressuriser 46 to form a vapour lock 78, and the pipe 74 has a U-bend 80 to form a hydrostatic thermal seal to prevent thermal convection currents within the pipe 74 external to the vessel 12.

There are one or more pipes 108 which interconnect a lower portion of the primary water coolant circuit with a lower portion of the tank 58 beneath the core 14. The pipes 108 comprise one or more pairs of inverted U-bends 110 within the hot primary circuit and normal U-bends 112 within the cool tank 58 in flow series which by means of the resultant temperature stratification of coolant in the inverted and normal U-bends, form hydrostatic thermal seals to limit or prevent unwanted ingress of water from the tank 58 to the primary water coolant circuit during normal steady state or transient operation.

The water within the tank 58 outside the vessel 12 is at a substantially lower temperature than the water inside the pressure vessel 12 during normal operation of the integral indirect cycle boiling water reactor, and a net thermal driving head forms around the emergency core cooling and residual heat removal circuit formed by the reactor core 14, the riser 24, the pipe 74 from the primary water coolant circuit to the tank 58, the tank 58 and the pipes 108 to the bottom of the primary water coolant circuit. This net thermal driving head is prevented from initiating a flow around the emergency core cooling and residual heat removal circuit by the vapour lock 78 in the inverted U-bend 76 in the pipe 74.

The pairs of inverted U-bends 110 and U-bends 112 prevent the flow of cold water from the tanks 58 into the primary water coolant circuit during normal operation. The inverted U-bends 110 and U-bends 112 are of equal length within and without the pressure vessel 12 respectively, and the inverted U-bends 110 contain water at the primary water coolant circuit temperature while the U-bends 112 contain water at the substantially lower temperature of the water in the tank 58. The resultant temperature/density stratification of the coolant in the inverted U-bends 110 and U-bends 112 creates a hydrostatic thermal seal to minimise unwanted ingress of water from the tank 58 to the primary circuit in normal operation.

This arrangement operates in substantially the same manner as the embodiment in FIGS. 1 to 7.

The integral pressure vessel defined by the tank 58 may in this example be an austenitic alloy pressure vessel or a prestressed concrete pressure vessel.

The integral PWR of FIGS. 1 to 6 and the integral BWR of FIGS. 4 or 7 could equally well be integrated with the full pressure emergency core cooling and residual heat removal tank in the manner shown in FIG. 8.

Figure 9:
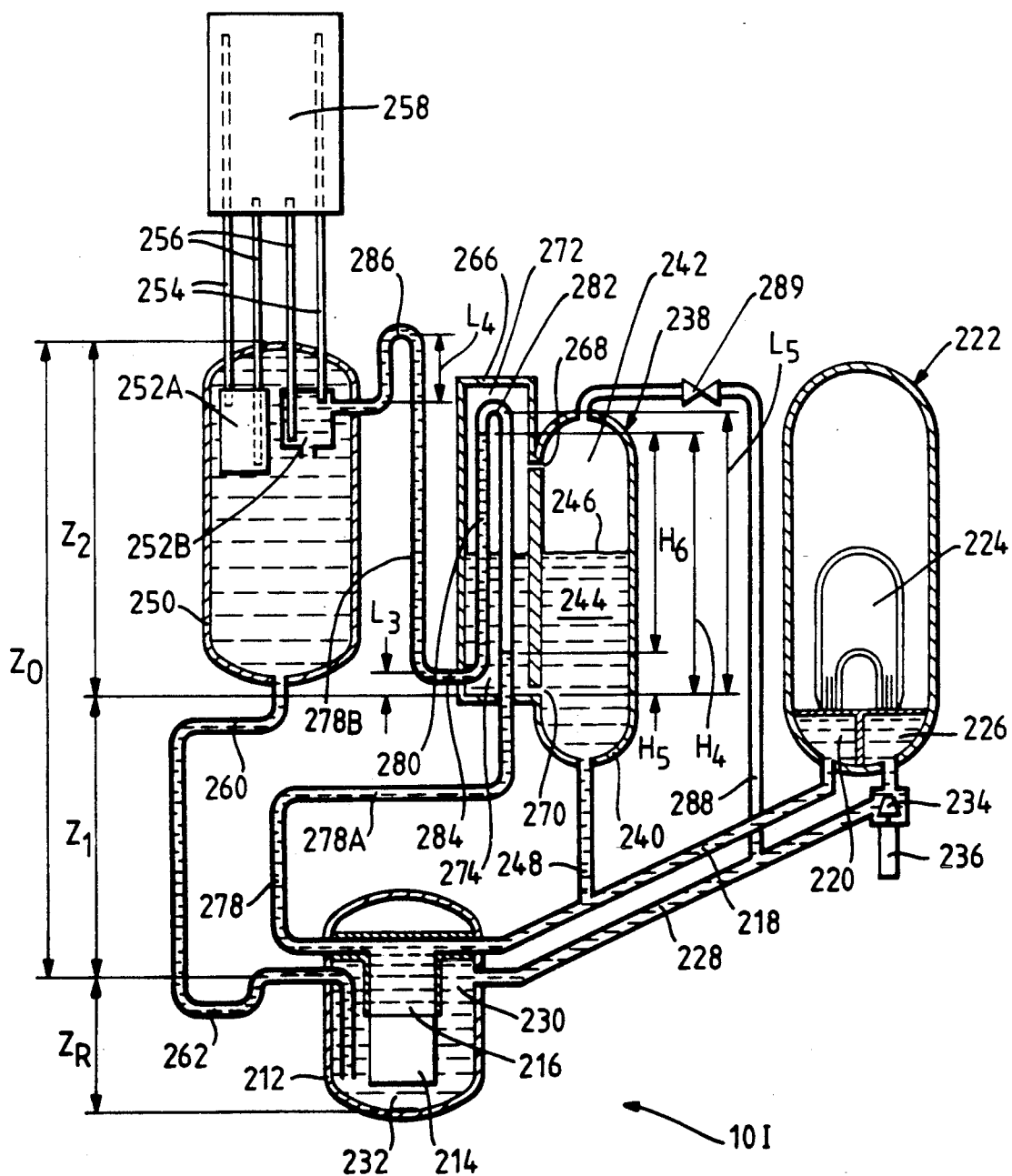
FIG. 9 is a vertical cross-sectional diagrammatical view of a dispersed or loop type water cooled nuclear reactor with separate pressuriser and separate full pressure emergency core cooling and residual heat removal system according to the present invention.

FIG. 9 shows a dispersed or loop type pressurised water cooled nuclear reactor (PWR) 101 with a single dispersed heat exchanger and a separate pressuriser.

The dispersed PWR nuclear reactor 101 comprises a pressure vessel 212 within which is positioned a reactor core 214. The reactor core 214 includes a system of neutron absorbing movable control rods linked to drive mechanisms (not shown). A primary water coolant circuit is provided to cool the reactor core 214. The primary water coolant circuit comprises a riser plenum or reactor core exit plenum 216, a first pipe 218 which conveys relatively hot water to an inlet header 220 in a heat exchanger 222, i.e. a steam generator. The inlet header 220 supplies the hot water through a bank of steam generator tubes 224 to an outlet header 226. The relatively cool water is returned through a second pipe 228 to a downcomer 230 which returns the now cool water via a reactor core inlet plenum 232 to the reactor core 214. A reactor coolant pump 234 is provided to drive the water through the primary water coolant circuit and the pump 234 is driven by a motor 236.

The heat exchanger 222 in this example is positioned outside of the pressure vessel 212 which contains the reactor core 214, and only a portion of the primary water coolant circuit is contained within the pressure vessel 212.

Although only one heat exchanger 222 is shown in FIG. 9, two, three of four heat exchangers may be provided together with respective pipes 218 and 228.

A separate pressuriser 238 is provided to maintain the primary water coolant in the primary water coolant circuit at a high pressure so that high primary water coolant temperatures can be achieved without boiling in the primary circuit. The pressuriser 238 comprises a separate pressure vessel 240 containing a steam space 242 and a water space 244 separated by a water level 246.

A surge pipe 248 interconnects the water space 244 of the pressuriser 238 with the, or one of the, first pipes 218 of the primary water coolant circuit. The pressuriser 238 acts as a surge tank for the primary water coolant circuit accepting excess water coolant from or supplying water coolant to the primary water coolant circuit as the water coolant within it expands or contracts as its average temperature rises or falls due to any transient imbalance between the power developed by the reactor core 214 and the power taken away by the heat exchanger 222.

One or more full pressure emergency core cooling and residual heat removal tanks 250 are provided vertically above the pressure vessel 212, which contains the reactor core 214 and a portion of the primary water coolant circuit. The tank 250 is filled with a reserve supply of primary water coolant, which may be borated.

Residual heat removal circuits comprising first heat exchanger coolers 252A and 252B positioned within the tank 250, and a second heat exchanger cooler 258 positioned outside of the tank 250. Pipes 254 and 256 fluidly interconnect the first and second heat exchanger coolers 252A, 252B and 258 for the transport of heat by natural convection of a fluid coolant from the first heat exchangers 252A, 252B to the second heat exchanger 258.

A pipe 260 interconnects a lower portion of the tank 250 with a lower portion of the primary water coolant circuit, i.e. the reactor core inlet plenum 232, within the pressure vessel 212. The pipe 260 incorporates a U-bend 262 at a suitably low elevation outside the pressure vessel 212 to form a hydrostatic thermal seal preventing thermal convection currents from the primary water coolant circuit to the main portion of the pipe 260 and tank 250.

A pipe 278 interconnects an upper portion of the primary water coolant circuit, i.e. the reactor core exit plenum 216, within the pressure vessel 212 with an upper portion of the tank 250.

The pressuriser 238 also comprises an auxiliary vessel 266 which is interconnected with the pressuriser 238 by pipes 268 and 270. The pipe 268 interconnects the steam space 242 in the pressuriser 238 with a steam space 272 formed in the auxiliary vessel 266, and the pipe 270 interconnects the water space 244 in the pressuriser 238 with a water space 274 in the auxiliary vessel 266.

The pipe 278 passes through the auxiliary vessel 266 of the pressuriser 238, and the pipe 278 incorporates a first inverted U-bend 280 which passes through the water space 274 and the steam space 272 of the auxiliary vessel 266 to form a vapour lock 282 within the inverted U-bend 280.

The pipe 278 also has a U-bend 284 and a second inverted U-bend 286 at a suitably high elevation outside the pressure vessel 12 before it inters the tank 250. The second inverted U-bend 286 forms a hydrostatic thermal seal to prevent eddy currents of warm water circulating in the pipe 278 during normal operation of the reactor entering the tank 58.

The pressuriser 238 may have electrical immersion heaters in the water space 244 to maintain the water and steam in the pressuriser 238 substantially at saturation conditions corresponding to the operating pressure of the pressurised water reactor plant. The water space 274 of the auxiliary vessel 266 may have electrical immersion heaters to create the saturation conditions producing a steam/water interface, or to augment that produced by the pressuriser 238.

The two sections of the pipe 278, i.e. the section 278A between the primary water coolant circuit and the inverted U-bend 280 and the section 278B between the inverted U-bend 280 and the tank 250 may be at different temperatures.

A small bore pipe 288 interconnects the steam space 242 of the pressuriser 238 with the, or one of the, second pipes 228 of the primary water coolant circuit, this allows a desuperheating spray of primary water coolant into the steam space 242 of the pressuriser 238 driven by the head loss across the core 214. The spray of primary water coolant is controlled by valves 289 in the pipe 288.

The arrangement operates in substantially the same manner as the embodiment in FIG. 1 and similar conditions regarding the balancing of the head loss through the core by the elevation heads in the riser pipe 278 and downcomer pipe 260 of the full pressure emergency core coolant and residual heat removal system apply so that the net driving head H6 measures the difference in density between the downcomer and riser of the primary circuit. In practice this will require a core with a relatively low head loss for a loop type PWR, or else a very high elevation $Z_o$ in FIG. 6.

Figure 10:
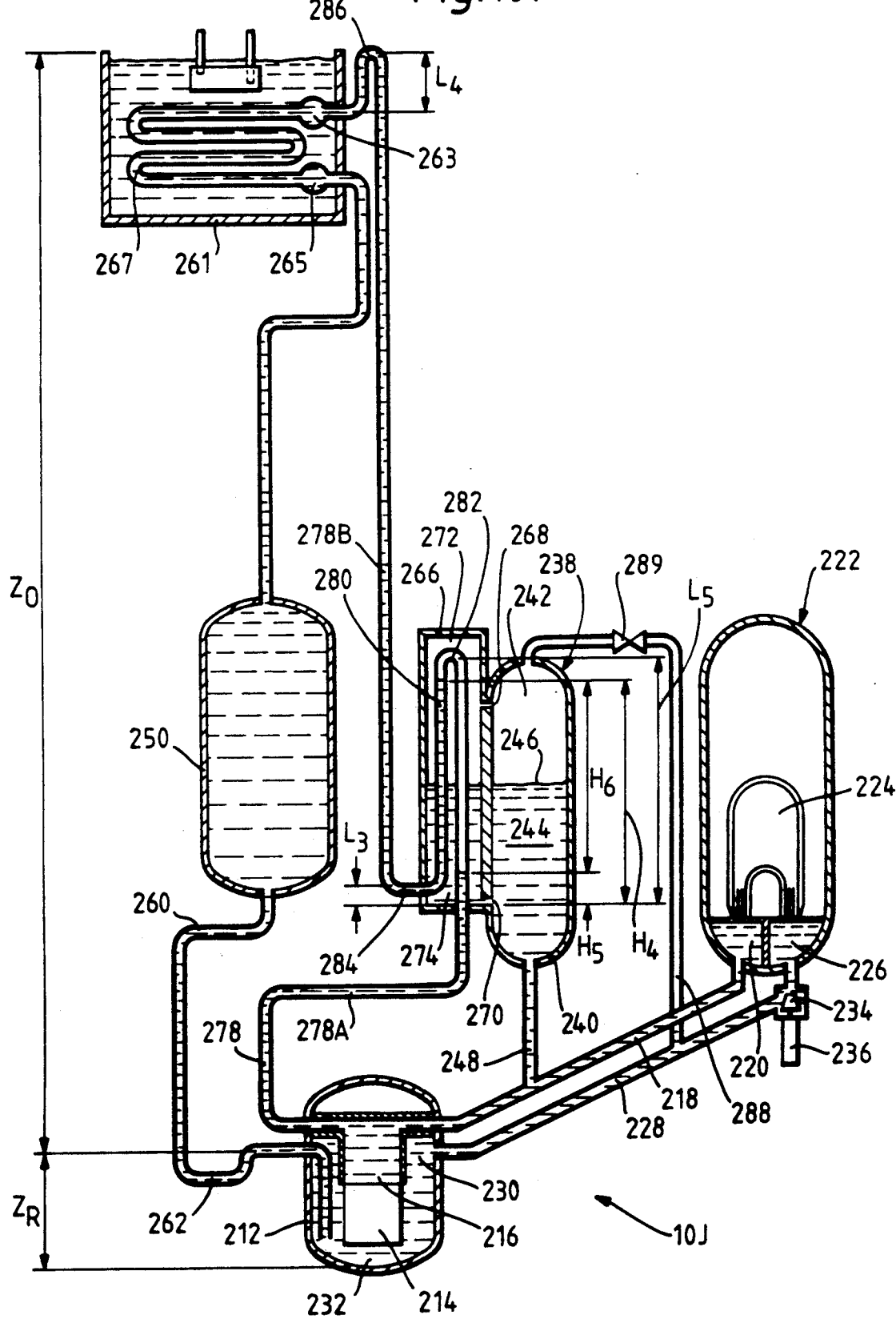
FIG. 10 is a vertical cross-sectional diagrammatical view of a second embodiment of a dispersed or loop type water cooled nuclear reactor with separate pressuriser and separate full pressure emergency core cooling and residual heat removal system according to the present invention.

FIG. 10 shows a second embodiment of a dispersed or loop type pressurised water cooled reactor (PWR) 10J with a single dispersed heat exchanger and a separate pressuriser and is substantially the same as the embodiment in FIG. 6. However this embodiment has a separate full pressure emergency core cooling tank 250 and a separate full pressure residual heat removal tank 261. The pipe 278 leads to a heat exchanger 267, in flow series with the full pressure emergency core coolant tank 250, located in the tank 261. The heat exchanger has a bank of cooling tubes 267 which extend between an inlet header 263 and an outlet header 265.

Figure 10B:
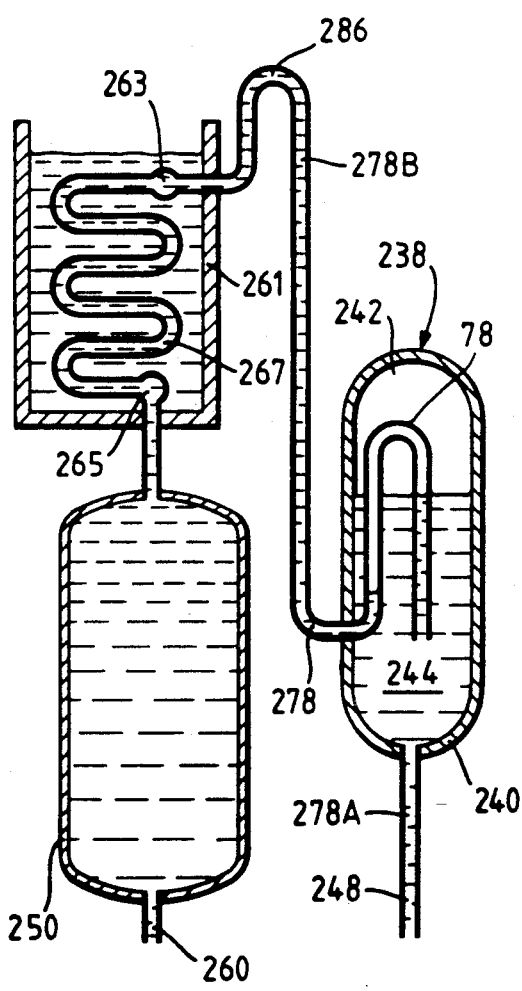
Figure 10C:
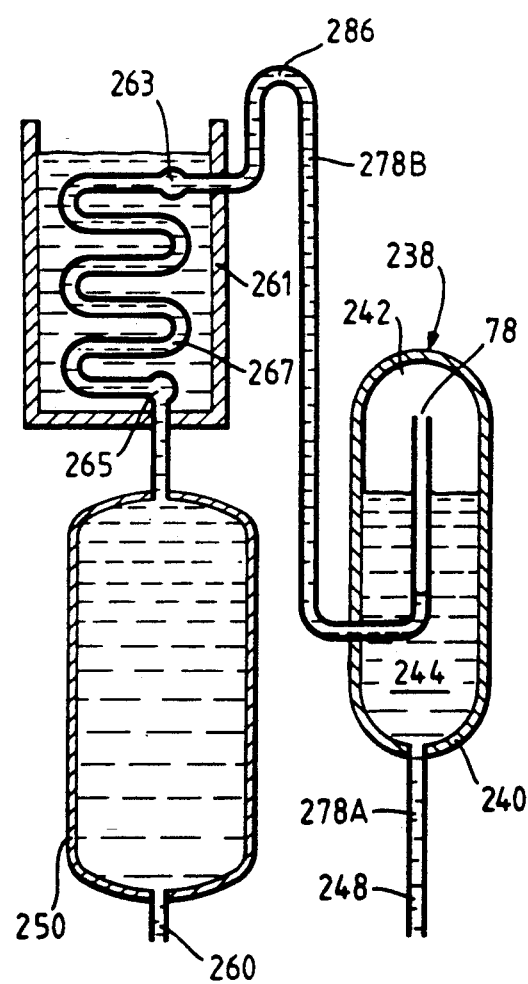

As with the integral water cooled reactor cases in FIGS. 1 and 2 the vapour lock may be located inside the pressuriser of a dispersed, or loop, type PWR. Two such arrangements are illustrated in FIGS. 10B and 10C. In these arrangements the surge pipe 248 also provides the function of the section 278A of the pipe 278 of FIGS. 9 and 10. The surge pipe 248 may be connected to the core exit plenum directly, as with pipe 278A or indirectly as with pipe 248 in FIGS. 9 and 10. In FIG. 10C the pressuriser 238 defines a part of the inverted U-bend and the steam space 242 forms the vapour lock 78.

The water levels indicated in FIGS. 10B and 10C illustrate the case where a sufficient elevation $Z_o$ is available to provide a thermal driving head in the full pressure emergency core coolant and residual heat removal circuit greater than the head loss through the reactor core in normal operation. FIG. 10D illustrates the water levels if the reactor core head loss is greater than the thermal head around this circuit.

If the reactor core head loss is greater than the thermal driving head around the emergency core coolant and residual heat removal circuit in normal operation, the vapour lock may not possess the full range of trip functions described earlier for the integral water cooled reactor cases. In particular the ability to sense abnormal pressuriser water levels and the ability to initiate a natural circulation flow in the correct direction through the residual heat removal circuit, may be affected. However some safety functions will be possible. Loss of coolant accidents, in particular, could be catered for.

FIGS. 10E and 10F illustrate vapour lock 78 arrangements to facilitate an emergency core coolant system applicable when the elevation $Z_o$ is insufficient to produce a net thermal elevation head in the external riser and downcomer sections of the full pressure emergency coolant and residual heat removal system greater than the head loss through the core in normal operation. The elevation of the top of the emergency core coolant tank 280 lies above the bottom of the pressuriser but below the normal range of pressuriser water levels. A vent pipe means connects the top of the emergency core coolant tank with the steam space of the pressuriser. A water level forms in the section of the vent pipe means above the emergency core coolant tank. This water level exceeds the pressuriser water level by an amount equal to the excess of the reactor core head loss over the natural circulation head around the closed circuit comprising the reactor core, the hot leg, the surge line, the pressuriser, the vent, the emergency coolant tank and its supply pipe to the core inlet plenum in the reactor pressure vessel.

In the event of a leak in the primary circuit the water levels in the pressuriser and vent will both fall, the latter level eventually entering the emergency coolant tank. The vent pipe enables the water in the emergency coolant tank to flow into the core inlet plenum of the reactor pressure vessel, to keep the core covered with water. In the event that vapour forms in the reactor core and reactor pressure vessel as the pressure falls, this is vented into the pressuriser via the surge line which connects to the reactor core exit plenum in the reactor pressure vessel either directly or via the hot leg pipework.

Figure 11:
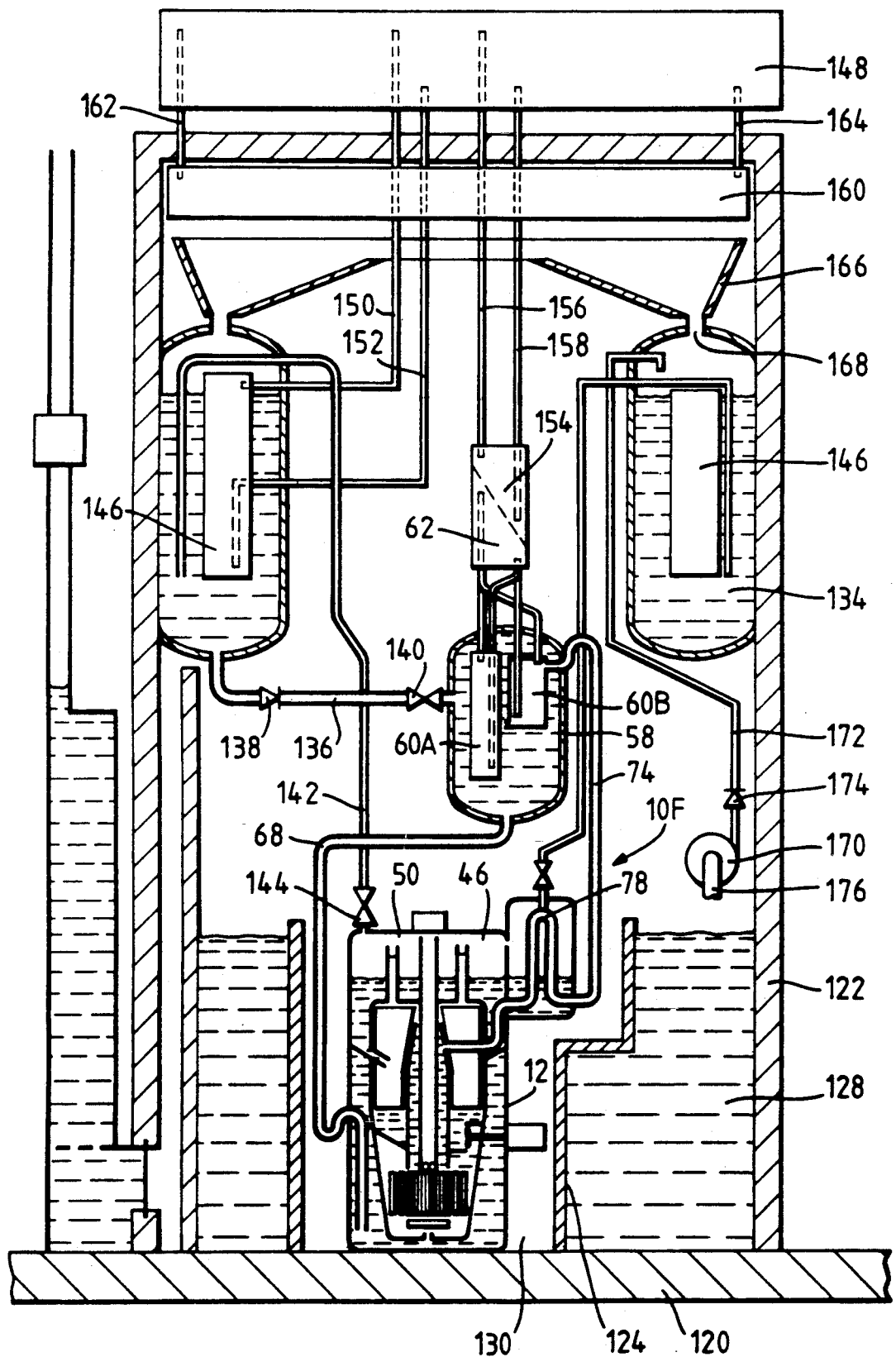
FIG. 11 is a vertical cross-sectional diagrammatical view of the water cooled nuclear reactor with integral pressuriser and full pressure emergency core cooling and residual heat removal system of FIG. 6 together with an additional low pressure emergency core cooling and residual heat removal system according to the present invention.

FIG. 11 shows the integral pressurised water reactor with integral pressuriser and combined full pressure emergency core cooling and residual heat removal system shown in FIG. 6 together with an additional, low pressure emergency core cooling and residual heat removal system.

The integral pressurised water reactor 10F, integral pressuriser 46 and combined full pressure emergency core cooling and residual heat removal tank 58 together with interconnecting pipes are positioned wholly within a containment building 122 which is built upon a suitable foundation 120. The integral pressurised water reactor 10F is positioned at a vertically lower region of the containment building 122, and is surrounded by a wall 124 which extends vertically upwards to substantially the same elevation as the top of the integral pressurised water reactor and integral pressuriser. A chamber 128 is formed between the wall 124 and the containment building 122, and the chamber is filled with water to form a pool, which may be used for storing spent reactor core fuel. A chamber 130 formed by wall 124, within which is positioned the integral pressurised water reactor, is normally dry, but which contains primary water coolant in the event that there is a leakage of primary water coolant from the pressurised water reactor so as to keep the pressure vessel 12 submerged in primary water coolant.

A second annular low pressure emergency core cooling and residual heat removal system comprises a tank 134 positioned in the containment building relatively high up, so that at least a portion of the second low pressure emergency core cooling and residual heat removal tank is vertically above the full pressure emergency core cooling and residual heat removal tank 58. A pipe 136 interconnects the lower region of the second tank 134 with the tank 58, and the pipe 136 is provided with a non-return valve 138 and a valve 140 which is normally closed. The pipe 136 allows the water in the second tank 134 to drain under gravity into the tank 58 and subsequently the pressure vessel 12 following a loss of primary water coolant circuit pressure.

Alternatively the pipe 136 with valves 138 and 140 may interconnect directly with the reactor pressure vessel 12 instead of the tank 58.

A pipe 142 interconnects the steam space 50 of the pressuriser 46 with the second tank 134, and the pipe 142 has a valve 144 which is normally closed. The pipe 142 allows controlled depressurisation of the pressuriser 46 by discharging steam from the steam space 50 of the pressuriser 46 into the water in the tank 134. The pipe 142 may contain an antisyphon feature to prevent back flow of coolant from the tank 134 to the pressure vessel following depressurisation.

A second residual heat removal circuit comprises third heat exchanger coolers 146 positioned within the tank 134, and a fourth heat exchanger cooler 148 positioned outside and vertically above the containment building 122. Pipes 150 and 152 fluidly interconnect the third and fourth heat exchanger coolers 146 and 148 for the transport of heat by natural convection of a fluid coolant from the third heat exchanger 146 to the fourth heat exchanger 148.

The second heat exchanger cooler 62 exchanges heat to an intermediate heat exchanger 154, and pipes 156 and 158 fluidly interconnect the intermediate heat exchanger 154 and the fourth heat exchanger cooler 148 of the second residual heat removal circuit for the transport of heat by natural convection of a fluid coolant from the intermediate heat exchanger 154 to the fourth heat exchanger 148.

A containment cooling circuit comprises a fifth heat exchanger cooler 160 positioned substantially at the uppermost regions of the containment building, and pipes 162 and 164 fluidly interconnect the heat exchanger cooler 160 and the second heat exchanger cooler 148 of the second residual heat removal circuit for the transport of heat by natural convection of a fluid coolant from the heat exchanger cooler 160 to the second heat exchanger cooler 148. The heat exchanger cooler 160 controls the temperature and pressure within the containment building during normal and accident conditions.

A large annular collecting vessel, or tundish, 166 is positioned within the containment building 122 vertically below the heat exchanger cooler 160 but vertically above the tank 134. The collecting vessel 166 is arranged to catch at least a portion of the condensate or vapour in the containment building condensed by the heat exchanger cooler 160. The bottom region of the collecting vessel 166 is interconnected with the tank 134 by one or more pipes 168 which supply condensed vapour under gravity to the tank 134.

A pump 170 is arranged to return split primary water coolant from the chamber 130 to the tank 134 via a pipe 172. The pipe 172 is provided with a non return valve 174. The pump 170 is located at an elevation which prevents lowering of the level of the spilt primary water coolant too far.

In operation in the event of an accident the vapour lock 78 is displaced allowing borated water to enter the reactor core 14 to shut it down and to produce a cooling flow of primary water coolant through the tank 58. Eventually the reactor core 14 residual heat falls to a low level and the temperature falls allowing manual or automatic controlled depressurisation of the primary water coolant circuit and the full pressure emergency core cooling and residual heat removal system. The controlled depressurisation is achieved by opening the valves 144 and 140. The tank 134 operates as a header tank to supply water to the primary water coolant circuit and the pressuriser 46 in the pressure vessel 12 and the tank 58, the steam space of the pressuriser 46 may be flooded with water.

In the event of a leak from the primary water coolant circuit controlled depressurisation of the primary water coolant circuit and emergency core cooling and residual heat removal system may be initiated relatively quickly to minimise the rate of spillage from the primary water coolant circuit. The spilt primary water coolant collects in the chamber 130 and rises upto a level at which the pump 170 becomes primed and activated. The pump 170 then returns the spilt primary water coolant to the tank 134 to make up for water drained from the tank 134 into the tank 58 and/or the primary water coolant circuit and pressuriser 46 in the pressure vessel 12. If the pump 170 fails to stop pumping at the appropriate primary water coolant level in the chamber 130 it will eventually loose its priming preventing the chamber 130 from being emptied of split primary water coolant.

The spilt primary water coolant from a primary water coolant circuit leak is initially replenished by gravity drain of primary water coolant from the full pressure emergency core cooling and residual heat removal tank 58. This primary water coolant is available immediately and continuously as long as it lasts. However, in the event of a very large leak, such as a failure of the pressure vessel 12, the primary water coolant in the tank 58 is soon used. The tank 58 may be sized to provide sufficient primary water coolant so as to provide a continuous supply of primary water coolant for the largest credible primary water coolant circuit leak until controlled depressurisation is achieved and reserve water from the tank 134 becomes available to replenish the tank 58, or to provide enough primary water coolant to flood the chamber 130 without help from the tank 134.

In the event of a relatively large leak, or if the pump 170 fails to operate with any size of leak, reactor core 14 cooling is maintained by the water boiling in the chamber 130. The vapour produced during this boiling is condensed by the heat exchanger cooler 160 of the containment cooling circuit, and the condensate falls into the collecting vessel 166 to be returned to the tank 134 and thence to the tank 58 and primary water coolant circuit to cool the reactor core 14.

The full pressure emergency core cooling and residual heat removal tank 58 together with the pipes 68 and 74 which interconnect with the primary water coolant circuit forms the first line of ultimate safety. The low pressure emergency core cooling and residual heat removal tank 134, pipes 136 and 140 which interconnect with the tank 58 and pressuriser 46 together with the pump 170, and the pipe 172 forms the second line of ultimate safety which is a partially passive, partially active arrangement. The evaporation of split primary water coolant in the chamber 130, the condensation of the vapour on the heat exchanger cooler 160 of the containment cooling circuit and the collection of the condensate by the collecting vessel 166 and return to the tank 134 forms a third line of ultimate safety which is completely passive.

The separate full pressure emergency core coolant tank and separate full pressure residual heat removal tank of FIG. 2 could also be used equally well in this arrangement. In that event the full pressure residual heat removal tank would form the low pressure emergency core cooling and residual heat removal tank.

Figure 12:
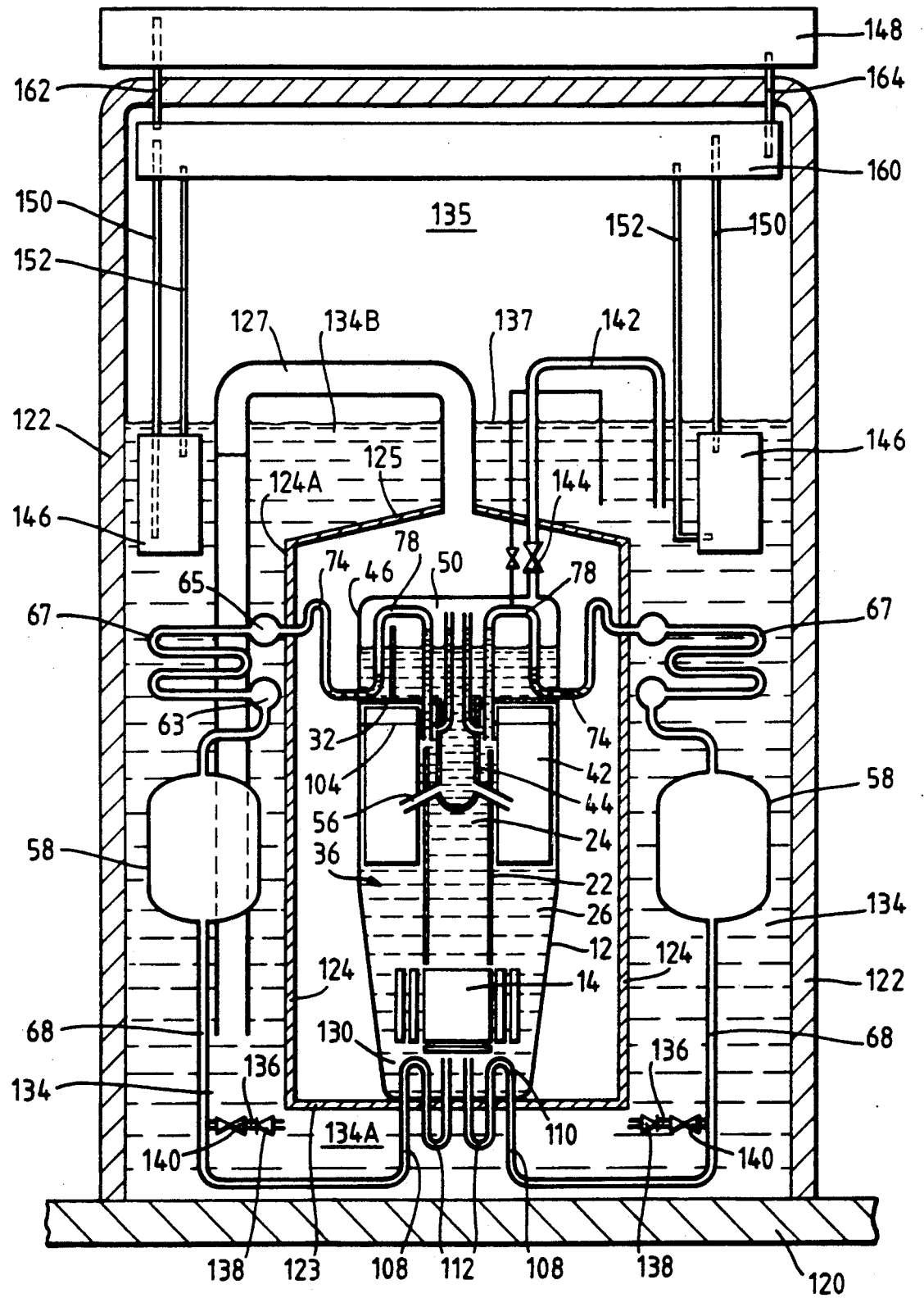
FIG. 12 is a vertical cross-sectional diagrammatical view of a water cooled nuclear reactor with integral pressuriser together with a full pressure emergency core cooling and residual heat removal system which is integrated with a low pressure emergency core cooling and residual heat removal system according to the present invention.

FIG. 12 shows the integral indirect cycle boiling water reactor with integral pressuriser of FIG. 8 with the separate full pressure emergency core cooling and residual heat removal system shown in FIG. 5 together with an additional low pressure emergency core cooling and residual heat removal system within a containment system.

The primary water coolant circuit and pressuriser arrangement is substantially the same as the embodiment shown in FIG. 8, and like parts are shown by like numerals, but differs in that the reactor pressure vessel 12 is positioned in a dry chamber 130 formed by a cylindrical wall 124 which has a bottom member 123 and a lid member 125. The low pressure emergency coolant and residual heat removal tank 134 completely surrounds the dry chamber 130, containing the reactor pressure vessel 12, the coolant tank 134 has a region 134A beneath and a region 134B above the chamber 130, and regions radially outward to the containment building wall 122.

The separate full pressure residual heat removal heat exchangers 67 and the separate full pressure emergency coolant tanks 58 reside within the low pressure residual heat removal and emergency coolant tank 134. They communicate with the primary circuit via the pipes 74 which contain the vapour locks 78 maintained, in normal operation of the reactor plant, by the pressuriser, and via the emergency cooling flow pipes 108 containing hydrostatic thermal seals maintained, in normal operation, by the temperature stratification zones 110, within the primary system, and 112 within the cool low pressure emergency coolant tank 134A, in a manner similar to that in FIG. 8.

The lid 125 above the reactor pressure vessel 15 is sealingly secured to prevent the water in the region 134B low pressure emergency coolant tank 134 from entering the dry cavity 130 during normal operation of the reactor plant. The dry cavity 130 is vented into the emergency coolant tank 134, which also acts as a suppression pool in the event of a loss of primary coolant accident, via the large vent 127. This vent 127 arches sufficiently far above the water level 137 in the low pressure emergency coolant tank and suppression pool 134 to avoid the possibility of syphoning water into the dry chamber 130. The vent 127 may contain an antisyphon device (not shown). The vent 127 may also contain a spare tube (not shown) at its extreme end within the suppression tube.

The lid 125 of the dry cylindrical wall 124 may be removed for refuelling or other maintenance of the reactor plant. In this event the water level 137 of the low pressure emergency coolant must be lowered below the top of the cylindrical wall 124.

The dry chamber 130 and the space 135 above the suppression pool 134 may be filled with an inert gas such as nitrogen or it may be evacuated.

At least one pipe 142 interconnects the steam space 50 of the pressuriser 46 with the low pressure emergency coolant tank/suppression pool 134 and the pipe 142 has a valve 144 which is normally closed. The pipe 142 allows controlled depressurisation of the reactor primary system by discharging steam from the steam space 50 of the pressuriser 46 into the suppression pool 134. The pipe 142 may contain an antisyphon device to prevent backflow of coolant following a depressurisation.

One or more pipes 136 interconnects the lower region 134A of the suppression pool with the low pressure emergency coolant tank 134 with the pipes 68 from the full pressure residual heat removal/emergency coolant system to the emergency coolant inlet pipes 108 beneath the reactor core. The pipes 136 contain a non-return valve 138, which prevents the flow of water from the primary circuit to the tank 134, and a valve 140 which is normally closed. The valve 140 is opened following a depressurisation of the reactor plant, whether controlled or accidental as in a serious loss of coolant from the primary water-coolant circuit.

A second, low pressure, residual heat removal circuit comprises third heat exchanger coolers 146 positioned within the tank 134, and a fourth heat exchanger cooler 148 positioned outside and above the containment building 122. A fifth heat exchanger 160, positioned high up in the containment building serves the dual role of an intermediate heat exchanger for the residual heat removal system 146 in the tank 134 and of containment cooler. Pipes 162 and 164 fluidly interconnect the heat exchangers 148 and 160 to transport heat from cooler 160 to cooler 148 by natural convection of a working fluid. Pipes 150 and 152 fluidly interconnect coolers 146 and 160 to transport heat from cooler 146 to the intermediate heat exchanger 160 by natural convection of a working fluid.

In the event of an abnormal plant condition occurring during reactor plant operation, the vapour locks 78 are displaced allowing borated water in the full pressure emergency coolant tanks 58 to enter the reactor core 14 to shut it down and to produce a flow of primary coolant from the reactor core through the full pressure residual heat removal coolers 67 in the tank 134. Thus the core residual or decay heat is dissipated into the water tank 134 and ultimately to the atmosphere via coolers 146,160 and 148. If necessary the valve 144 may be opened to execute a controlled depressurisation of the primary water coolant circuit. Also if necessary valves 136 may be opened to allow the primary water coolant inventory to be made up as the plant cools down.

In the event of a large loss of coolant accident (LOCA), due say to a failure of the reactor pressure vessel 12, vapour and entrained water released into the dry chamber 130 is discharged into the suppression pool 134 via the vent 127. If the LOCA is due to failure of the high pressure components of the full pressure emergency cooling and residual heat removal systems the leaking coolant discharges directly into the suppression pool 134. Valves 144 and 140 may be opened automatically, activated by a low primary water coolant circuit pressure signal, to facilitate controlled depressurisation of the plant and an emergency cooling flow from the low pressure emergency coolant tank cum suppression pool 134 through pipes 136 and 108. In the event that the reactor pressure vessel 12 is ruptured the dry cavity 130 will fill up with water from the tank 134. Subsequent removal of residual or decay heat from the reactor core 14 may be due to boiling off the water through the vent 127 and/or through pipe 142, via the open valve 144, with replenishment via pipes 108 and 136, via the open valves 140, and due to natural circulation through the full pressure residual heat removal cooler 67.

Heat dumped into the suppression pool 134 is ultimately rejected to atmosphere by the coolers 148 outside the containment building 122. The heat transport path may be via coolers 146 and 160 or by evaporation of water in the suppression pool and subsequent condensation of this on the containment coolers 160.

Figure 13:
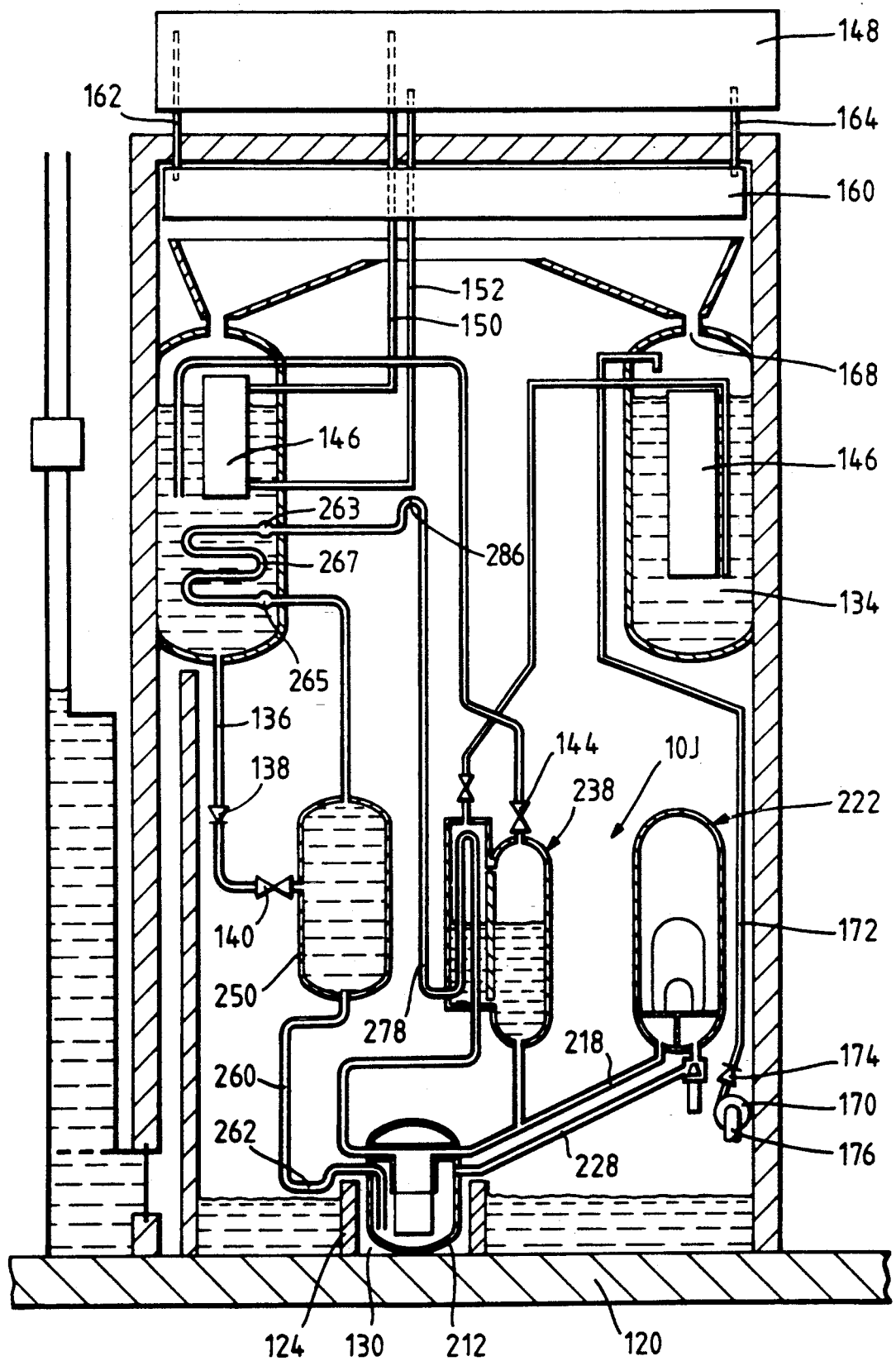
FIG. 13 is a vertical cross-sectional diagrammatical view of the dispersed or loop type water cooled nuclear reactor with separate pressuriser and full pressure emergency core cooling and residual heat removal system of FIG. 10 together with an additional low pressure emergency core cooling and residual heat removal system according to the present invention.

FIG. 13 shows the dispersed or loop type pressurised water reactor with a single dispersed heat exchanger and a separate pressuriser and separate full pressure emergency core cooling and residual heat removal system shown in FIG. 10 together with an additional low pressure emergency core cooling and residual heat removal system.

The arrangement is substantially the same as the embodiment shown in FIG. 11, and like parts are shown by like numerals. This embodiment illustrates the alternative case to FIG. 11 where the full pressure emergency core coolant tank is separate from a full pressure residual heat removal tank. The full pressure residual heat removal cooler is located in the low pressure emergency core cooling and residual heat removal tank. The arrangement operates in substantially the same manner as the embodiment in FIG. 11.

Although the figures and description show a first pipe interconnecting an upper portion of the primary water coolant circuit with an upper portion of a full pressure passive emergency core coolant tank, and a second pipe interconnecting a lower portion of the primary water coolant circuit with a lower portion of the full pressure passive emergency core coolant tank together with a full pressure residual heat removal heat exchanger, it may be possible to use the full pressure passive emergency core coolant tank alone or to use the full pressure residual heat removal heat exchanger alone together with the first inverted U-bend in the first pipe.

A water cooled nuclear reactor may be arranged to have one or more of the first pipes, each of which has a first inverted U-bend, interconnected with a full pressure passive emergency core coolant tank and one or more of the first pipes, each of which has a first inverted U-bend, interconnected with a full pressure residual heat removal heat exchanger.

The main features of this invention are the vapour lock formed in the first inverted U-bend in the riser pipe connecting the primary water coolant circuit to the full pressure emergency core coolant tank or residual heat removal heat exchanger, which is maintained by the pressuriser and which operates upon abnormal conditions in the pressuriser and in the reactor core and riser of the primary water coolant circuit to trip accordingly, and the creation of hydrostatic thermal seals by means of inverted U-bends and normal U-bends to control the temperatures of the riser and downcomer pipe work of the full pressure emergency core coolant tank or residual heat removal system and hence the thermal driving head around this system during normal reactor plant operation when the system is in a quiescent or waiting mode, and the use of these U-bends and inverted U-bends to stabilise the full pressure emergency core coolant tank or residual heat removal system during normal plant transients and perturbations.

We claim:

1. A water cooled nuclear reactor comprising a pressure vessel, a reactor core, a primary water coolant circuit, a pressuriser, the reactor core and at least a portion of the primary water coolant circuit being located in the pressure vessel, the primary water coolant circuit being arranged to cool the reactor core, the pressuriser having a water space and a steam space, at least one full pressure reactor core cooler means, first pipe means to interconnect an upper portion of the primary water coolant circuit with each full pressure reactor core cooler means, second pipe means to interconnect a lower portion of the primary water coolant circuit with each full pressure reactor core cooler means, each first pipe means having a first inverted U-bend, each first inverted U-bend of the first pipe means passes through the water space and steam space of the pressuriser to form a vapour lock within each first inverted U-bend, whereby each vapour lock in normal operation substantially prevents a natural circulation of primary water coolant from the primary water coolant circuit through the first pipe means, the full pressure reactor core cooler means and the second pipe means to the primary water coolant circuit, each vapour lock upon abnormal operation of any of the reactor core, the primary water coolant circuit, or the pressuriser thereby being displaced from the first inverted U-bend to allow a natural circulation of primary water coolant from the primary water coolant circuit through the first pipe means, the full pressure reactor cooler means and the second pipe means to allow relatively cool primary water coolant in the full pressure reactor core cooler means to flow into or through the primary water coolant circuit.

2. A water cooled nuclear reactor as claimed in claim 1 in which at least one of the full pressure reactor core cooler means comprises a full pressure emergency core coolant tank having a reserve supply of primary water coolant, the first pipe means interconnects an upper portion of the primary water coolant circuit with an upper portion of the full pressure emergency core coolant tank, the second pipe means interconnects a lower portion of the primary water coolant circuit with a lower portion of the full pressure emergency core coolant tank, at least a portion of the full pressure emergency core coolant tank being positioned above the reactor core, the first pipe means having a first inverted U bend, the first inverted U-bend of the first pipe means passes through the water space and steam space of the pressuriser to form a vapour lock within the first inverted U-bend, whereby the vapour lock in normal operation substantially prevents a natural circulation of primary water coolant from the primary water coolant circuit through the first pipe means, the full pressure emergency core coolant tank and the second pipe means to the primary water coolant circuit, the vapour lock upon abnormal operation of the reactor core, the primary water coolant circuit, or the pressuriser thereby being displaced from the first inverted U-bend to allow a natural circulation of primary water coolant from the primary water coolant circuit through the first pipe means, the full pressure emergency core coolant tank and the second pipe means to the primary water coolant circuit to allow relatively cool primary water coolant in the full pressure emergency core coolant tank to flow through the reactor core, or to allow primary water coolant vapour to be vented from the primary water coolant circuit through the first pipe means into the full pressure emergency core coolant tank to facilitate a gravity feed of primary water coolant from the full pressure emergency core coolant tank into the primary water coolant circuit.

3. A water cooled nuclear reactor as claimed in claim 1 in which at least one of the full pressure reactor core cooler means comprises a full pressure residual heat removal heat exchanger, the first pipe means interconnects an upper portion of the primary water coolant circuit with an upper portion of the full pressure residual heat removal heat exchanger, the second pipe means interconnects a lower portion of the primary water coolant circuit with a lower portion of the full pressure residual heat removal heat exchanger, at least a portion of the full pressure residual heat removal heat exchanger being positioned above the primary water coolant circuit, the first pipe means having a first inverted U-bend, the first inverted U-bend of the first pipe means passes through the water space and steam space of the pressuriser to form a vapour lock within the first inverted U-bend whereby the vapour lock in normal operation substantially prevents a natural circulation of primary water coolant from the primary water coolant circuit through the first pipe means, the full pressure residual heat removal heat exchanger and the second pipe means to the primary water coolant circuit, the vapour lock upon abnormal operation of the reactor core, the primary water coolant circuit or the pressuriser thereby being displaced from the first inverted U-bend to allow a natural circulation of primary water coolant from the primary water coolant circuit through the first pipe means, the full pressure residual heat removal heat exchanger and the second pipe means to the primary water coolant circuit to allow relatively cool primary water coolant to flow through the reactor core.

4. A water cooled nuclear reactor as claimed in claim 1 in which a full pressure residual heat removal heat exchanger and a full pressure emergency core coolant tank are integrated and are fluidly connected in flow series such that they share a common first pipe means, first inverted U-bend and second pipe means.

5. A water cooled nuclear reactor as claimed in claim 1 in which a full pressure residual heat removal heat exchanger and a full pressure emergency core coolant tank are separate and have their own respective first pipe means, first inverted U-bend and second pipe means.

6. A water cooled nuclear reactor as claimed in claim 2 in which at least a portion of the full pressure emergency core coolant tank is positioned above the primary water coolant circuit.

7. A water cooled nuclear reactor as claimed in claim 1 in which the inverted U-bend in the first pipe means has an electrical immersion heater to assist in the formation and maintenance of the vapour lock and to facilitate the removal of incondensible gases.

8. A water cooled nuclear reactor as claimed in claim 1 in which each first pipe means has hydrostatic thermal seals allowing the circulation of warm water eddy currents in the first pipe means during normal operation of the reactor plant and preventing the warm water eddy currents in the first pipe means entering the full pressure reactor core cooler means in normal operation of the nuclear reactor, the hydrostatic thermal seals allowing the natural circulation of primary water coolant from the primary water coolant circuit through the first pipe means, the full pressure reactor core cooler means and the second pipe means when the vapour lock is displaced from the first inverted U-bend by abnormal operation of the reactor core, the primary water coolant circuit or the pressuriser.

9. A water cooled nuclear reactor as claimed in claim 8 in which a second inverted U-bend in each first pipe means forms a hydrostatic thermal seal.

10. A water cooled nuclear reactor as claimed in claim 8 in which a U-bend in each first pipe means forms a hydrostatic thermal seal.

11. A water cooled nuclear reactor as claimed in claim 1 in which each second pipe means has a hydrostatic thermal seal preventing thermal convection from the primary water coolant circuit to the full pressure reactor core cooler means.

12. A water cooled nuclear reactor as claimed in claim 11, in which a U-bend in the second pipe means forms the hydrostatic thermal seal.

13. A water cooled nuclear reactor as claimed in claim 11 in which inverted U-bend, and a normal U-bend connected in series in each second pipe means forms the hydrostatic thermal seal, the inverted U-bend is positioned in a relatively hot region and the normal U-bend is positioned in a relatively cool region to produce alternating stratification zones of lower and higher water density in the hydrostatic thermal seal.

14. A water cooled nuclear reactor as claimed in claim 1 in which the pressuriser has an auxiliary vessel, the auxiliary vessel having a water space and a steam space, at least the water space of the auxiliary vessel being interconnected with the water space of the pressuriser, the first inverted U-bend of the first pipe means passes through the water space and steam space of the auxiliary vessel.

15. A water cooled nuclear reactor as claimed in claim 1 in which the pressuriser has an auxiliary vessel, the auxiliary vessel having a water space and a steam space, at least the water space of the auxiliary vessel being interconnected with an upper portion of the primary water coolant circuit, the first inverted U-bend of the first pipe means passes through the water space and steam space of the auxiliary vessel.

16. A water cooled nuclear reactor as claimed in claim 14 in which the steam space of the auxiliary vessel is interconnected with the steam space of the pressuriser.

17. A water cooled nuclear reactor as claimed in claim 14, in which the auxiliary vessel has an electrical immersion heater to maintain saturation conditions in the water space and steam space of the auxiliary vessel.

18. A water cooled nuclear reactor as claimed in claim 14, in which the auxiliary vessel defines a portion of the first inverted U-bend and the steam space of the auxiliary vessel forms the vapour lock.

19. A water cooled nuclear reactor-as claimed in claim 1 in which a relatively small vent interconnects the vapour lock and the steam space of the pressuriser to allow a flow of incondensible gases from the vapour lock to the steam space of the pressuriser, to assist in the formation and maintenance of the vapour lock in normal operation and to provide the vapour lock with a required transient response.

20. A water cooled nuclear reactor as claimed in claim 1 in which the pressuriser defines a portion of the first inverted U-bend and the steam space of the pressuriser forms the vapour lock.

21. A water cooled nuclear reactor as claimed in claim 8 in which the full pressure emergency core coolant tank is integrated with the full pressure residual heat removal heat exchanger having at least one residual heat removal means to remove heat from the primary water coolant in the combined full pressure emergency core cooling and residual heat removal system.

22. A water cooled nuclear reactor as claimed in claim 21 in which each full pressure emergency core coolant tank has at least one residual heat removal circuit to remove heat from the primary water coolant in the full pressure emergency core cooling and residual heat removal tank.

23. A water cooled nuclear reactor as claimed in claim 21 in which the at least one combined full pressure emergency core cooling and residual heat removal tank has an enclosed region, the first pipe means interconnects the primary water coolant circuit and the enclosed region, the enclosed region having one of the residual heat removal circuits to increase the heat transfer rate from the primary water coolant to the residual heat removal circuit.

24. A water cooled nuclear reactor as claimed in claim 22 in which the residual heat removal circuit comprises a first heat exchanger positioned in the full pressure emergency core cooling and residual heat removal tank, a second heat exchanger positioned outside of the full pressure emergency core cooling and residual heat removal tank, ducting interconnecting the first and second heat exchangers to convey working fluid therebetween.

25. A water cooled nuclear reactor as claimed in claim 23 in which the reactor pressure vessel is positioned in the combined full pressure emergency core coolant and residual heat removal tank.

26. A water cooled nuclear reactor as claimed in claim 4 in which a second low pressure emergency core cooling and residual heat removal system comprises a tank having a further supply of primary water coolant at low pressure, at least a portion of the low pressure emergency core coolant tank being positioned above the full pressure emergency core coolant tank, a third pipe means to interconnect a lower portion of the low pressure emergency core cooling and residual heat removal tank with the full pressure emergency core coolant tank, a fourth pipe means to interconnect the steam space of the pressuriser with the low pressure emergency core coolant tank, the third pipe means has a non return valve and a control valve, the fourth pipe means has a control valve.

27. A water cooled nuclear reactor as claimed in claim 26 in which the full pressure residual heat removal heat exchanger is located in the second low pressure emergency core coolant and residual heat removal tank.

28. A water cooled nuclear reactor as claimed in claim 26 in which the full pressure emergency core cooling and residual heat removal system is located in the low pressure emergency core cooling and residual heat removal tank.

29. A water cooled nuclear reactor as claimed in claim 26 in which at least one second residual heat removal means is arranged to remove heat from the water in the second low pressure emergency core cooling and residual heat removal tank.

30. A water cooled nuclear reactor as claimed in claim 26 in which the water in the low pressure emergency core cooling and residual heat removal tank forms a heat sink for the full pressure emergency core cooling and residual heat removal system.

31. A water cooled nuclear reactor as claimed in claim 26 comprising a containment building, the pressure vessel, the reactor core, the primary water coolant circuit, the pressuriser, the full pressure emergency core cooling and residual heat removal system and the low pressure emergency core cooling and residual heat removal tank being positioned within the containment building, a fifth pipe means interconnects a pump means with the low pressure emergency core cooling and residual heat removal tank, the pump means being arranged to pump any spilt water coolant above a predetermined level in the containment building to the low pressure emergency core cooling and residual heat removal tank, the fifth pipe means has a non return valve.

32. A water cooled nuclear reactor as claimed in claim 31 in which the at least one second residual heat removal circuit comprises a third heat exchanger positioned in the low pressure emergency core cooling and residual heat removal tank, a fourth heat exchanger positioned outside of the containment building, ducting means interconnecting the third and fourth heat exchangers to convey working fluid therebetween.

33. A water cooled nuclear reactor as claimed in claim 31 comprising a fifth heat exchanger positioned substantially at the uppermost region of the containment building, ducting means interconnecting the fifth heat exchanger and the fourth heat exchanger to convey working fluid therebetween, a collecting vessel positioned below the fifth heat exchanger and above the second emergency core cooling and residual heat removal tank for collecting vapour condensed by the fifth heat exchanger, pipe means to supply condensed vapour from the collecting vessel to the second emergency core cooling and residual heat removal tank.

34. A water cooled nuclear reactor as claimed in claim 32 comprising an intermediate heat exchanger, ducting means interconnecting the intermediate heat exchanger and the fourth heat exchanger to convey working fluid therebetween, the second heat exchanger exchanging heat to the intermediate heat exchanger, the intermediate heat exchanger and second heat exchanger being positioned inside the containment building.

35. A water cooled nuclear reactor as claimed in claim 28 in which the reactor pressure vessel is located within a dry chamber surrounded by a low pressure emergency core coolant and residual heat removal tank formed between a wall of the dry chamber and a wall of a containment building, the dry chamber being interconnected with the said tank via a large vent from an upper region of the dry chamber to a lower region of the low pressure emergency coolant and residual heat removal tank, which also acts as a containment pressure suppression pool.

36. A water cooled nuclear reactor as claimed in claim 1 in which the emergency core cooling and residual heat removal tanks contain a neutron absorbing agent dissolved in the water.

37. A water cooled nuclear reactor as claimed in claim 36 in which the neutron absorbing agent is boron in the form of boric acid.

38. A water cooled nuclear reactor as claimed in claim 1 in which at least a portion of the water space of the pressuriser is positioned above an upper portion of the primary water coolant circuit, at least one means which communicates between the pressuriser and the primary water coolant circuit to connect the steam space of the pressuriser with the upper portion of the primary water coolant circuit, at least one surge port means which communicates between the pressuriser and the primary water coolant circuit to connect the water space of the pressuriser with a lower portion of the primary water coolant circuit, the at least one surge port means being arranged to have relatively low flow resistance for water from the water space of the pressuriser to the primary water coolant circuit and relatively high flow resistance for water from the primary water coolant circuit to the water space of the pressuriser, the at least one means which communicates between the steam space of the pressuriser and the upper portion of the primary water coolant circuit allows excess vapour formed in the primary water coolant circuit to flow to the steam space of the pressuriser.

39. A water cooled nuclear reactor as claimed in claim 38 in which the reactor core, the primary water coolant circuit and the pressuriser are arranged as an integral unit enclosed by the pressure vessel, at least one casing being arranged in the pressure vessel to substantially divide the pressure vessel into a first chamber and a second chamber, the reactor core and the primary water coolant circuit being arranged in the second chamber, the pressuriser being arranged in the first chamber, the casing preventing mixing interaction between the water in the primary water coolant circuit and the water in the water space of the pressuriser.

40. A water cooled nuclear reactor as claimed in claim 1 in which the first pipe means interconnects the water space of the pressuriser with the full pressure reactor core cooler means.

41. A water cooled nuclear reactor as claimed in claim 1 in which the the water cooled nuclear reactor is an integral pressurised water reactor.

42. A water cooled nuclear reactor as claimed in claim 1 in which the water cooled nuclear reactor is an integral indirect cycle boiling water reactor.

* * * * *